United States Patent
Sanfilippo et al.

(10) Patent No.: US 10,689,142 B2
(45) Date of Patent: Jun. 23, 2020

(54) APPARATUS TO FORM EDGES IN A PACKAGE MADE OF FLEXIBLE MATERIAL

(71) Applicant: CLEAR LAM PACKAGING, INC., Elk Grove Village, IL (US)

(72) Inventors: John E. Sanfilippo, Barrington Hills, IL (US); James J. Sanfilippo, Barrington Hills, IL (US); Francisco Javier Soria, West Chicago, IL (US); Milorad Radenovic, Chicago, IL (US)

(73) Assignee: PRIMAPAK, LLC, Elgin, IL (US)

( * ) Notice: Subject to any disclaimer, the term of this patent is extended or adjusted under 35 U.S.C. 154(b) by 488 days.

(21) Appl. No.: 15/124,612

(22) PCT Filed: Mar. 11, 2015

(86) PCT No.: PCT/US2015/020032
§ 371 (c)(1),
(2) Date: Sep. 8, 2016

(87) PCT Pub. No.: WO2015/138651
PCT Pub. Date: Sep. 17, 2015

(65) Prior Publication Data
US 2017/0015454 A1    Jan. 19, 2017

Related U.S. Application Data

(60) Provisional application No. 61/951,493, filed on Mar. 11, 2014.

(51) Int. Cl.
*B65B 51/30* (2006.01)
*B29C 65/02* (2006.01)
(Continued)

(52) U.S. Cl.
CPC .............. *B65B 51/30* (2013.01); *B29C 53/06* (2013.01); *B29C 65/02* (2013.01); *B29C 66/431* (2013.01);
(Continued)

(58) Field of Classification Search
None
See application file for complete search history.

(56) References Cited

U.S. PATENT DOCUMENTS

| | | | |
|---|---|---|---|
| 4,077,186 A | 3/1978 | Voegele | |
| 4,737,231 A * | 4/1988 | Seko | B29C 65/26 100/328 |

(Continued)

FOREIGN PATENT DOCUMENTS

| | | |
|---|---|---|
| DE | 4203798 A1 | 8/1993 |
| EP | 0976539 A1 | 2/2000 |

(Continued)

OTHER PUBLICATIONS

International Search Report and Written Opinion, International Application No. PCT/US2015/020032, dated Jul. 24, 2015.

*Primary Examiner* — Barbara J Musser
(74) *Attorney, Agent, or Firm* — Marshall, Gerstein & Borun LLP

(57) ABSTRACT

An apparatus for forming a seal (40-44) along an edge portion of a flexible package (10) that is made from a sheet of flexible material (137) includes an elongated film folding member (102) and at least one heating and/or sealing member (104), the at least one heating and/or sealing member (104) extending along a first heat/seal axis parallel to a lengthwise axis (108) of the film folding member (102). A first engagement end (112) of the film folding member is adapted to contact a portion of the sheet of flexible material (137) during a sealing process and the at least one heating and/or sealing member (104) is adapted to heat the portion (Continued)

of the sheet of flexible material (137) during the sealing process such that the contact between the first engagement end (112) and the portion of the sheet of flexible material creates the seal along the edge portion of the flexible package (10).

4 Claims, 28 Drawing Sheets

(51) Int. Cl.
    *B65B 51/26*     (2006.01)
    *B65B 9/20*     (2012.01)
    *B65B 61/00*     (2006.01)
    *B29C 53/06*     (2006.01)
    *B29L 31/00*     (2006.01)
    *B29C 65/00*     (2006.01)

(52) U.S. Cl.
    CPC .. *B29C 66/81425* (2013.01); *B29C 66/83241* (2013.01); *B29C 66/849* (2013.01); *B65B 9/2049* (2013.01); *B65B 51/26* (2013.01); *B65B 61/00* (2013.01); *B29C 66/1122* (2013.01); *B29C 66/81415* (2013.01); *B29L 2031/7162* (2013.01); *B29L 2031/7166* (2013.01); *B65B 9/2056* (2013.01); *B65B 2220/12* (2013.01)

(56) References Cited

U.S. PATENT DOCUMENTS

| | | | |
|---|---|---|---|
| 6,729,108 B2 * | 5/2004 | Tsuruta | B29C 65/02 53/451 |
| 2001/0005979 A1 | 7/2001 | Kuss et al. | |
| 2015/0101757 A1 | 4/2015 | Ohnishi et al. | |

FOREIGN PATENT DOCUMENTS

| | | |
|---|---|---|
| EP | 1228964 A1 | 8/2002 |
| WO | WO-2005/025993 A1 | 3/2005 |
| WO | WO-2007/114752 A1 | 10/2007 |
| WO | WO-2010/054226 A2 | 5/2010 |
| WO | WO-2013/175822 A1 | 11/2013 |

* cited by examiner

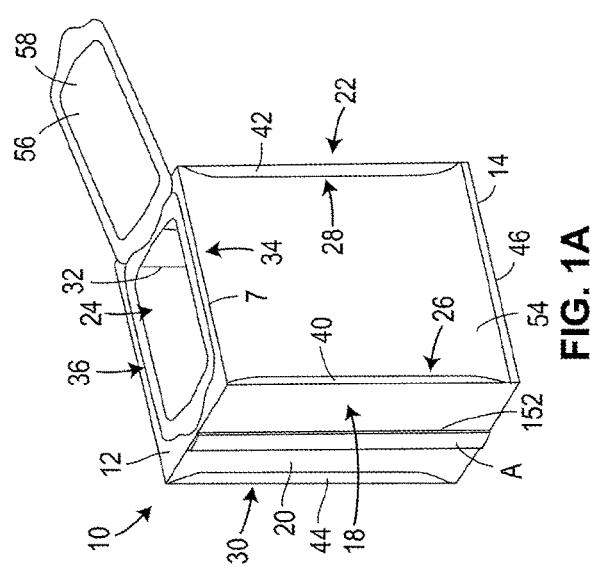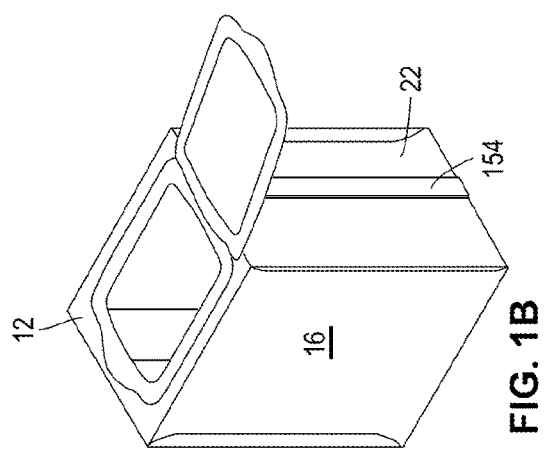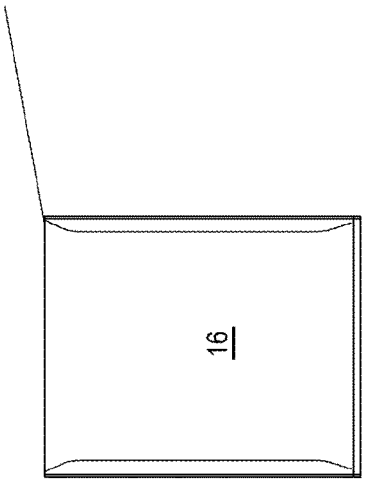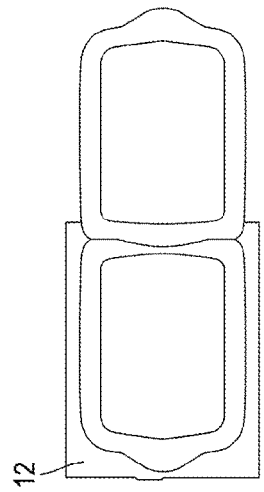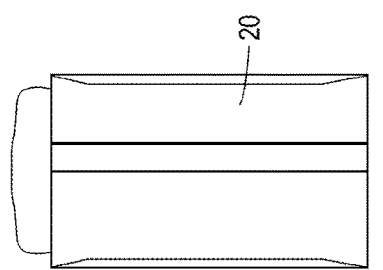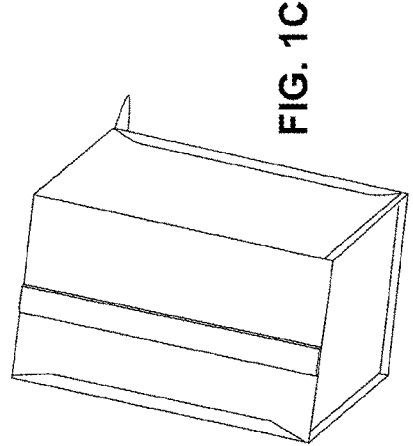

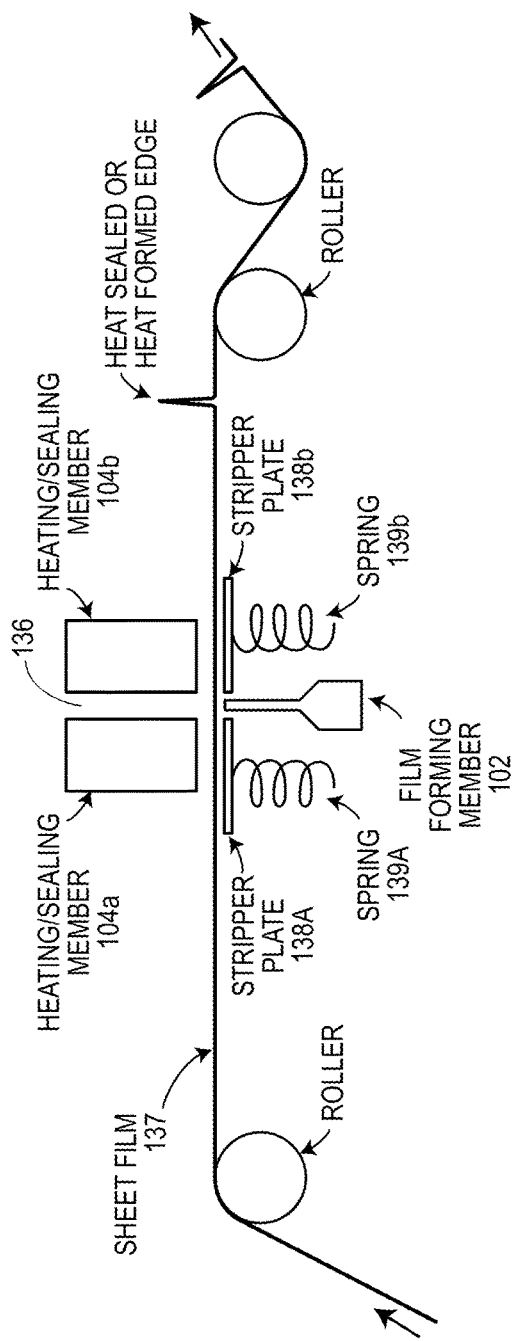
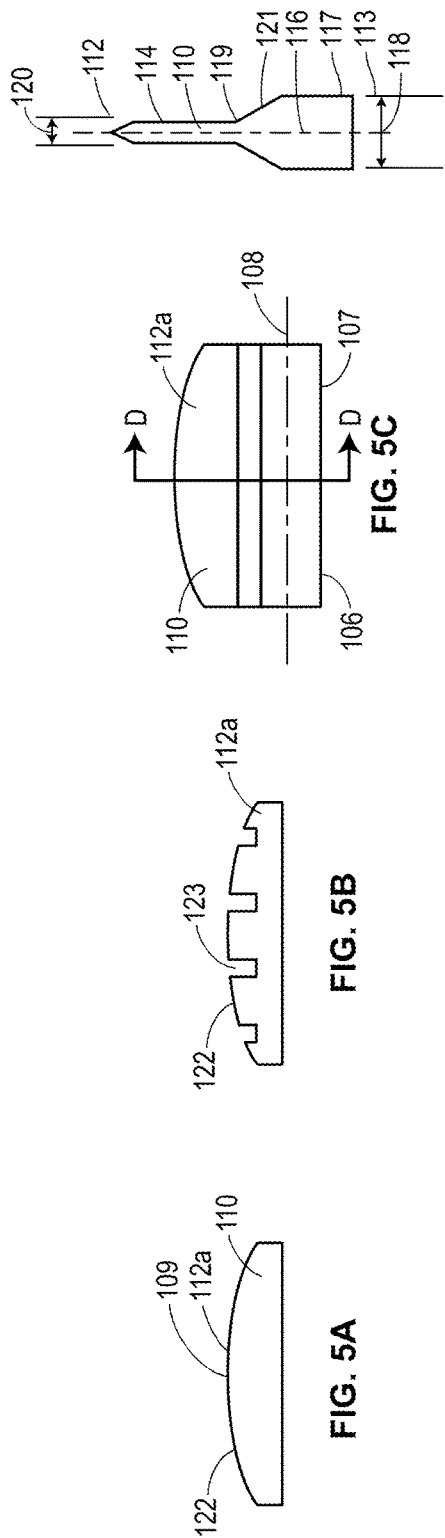

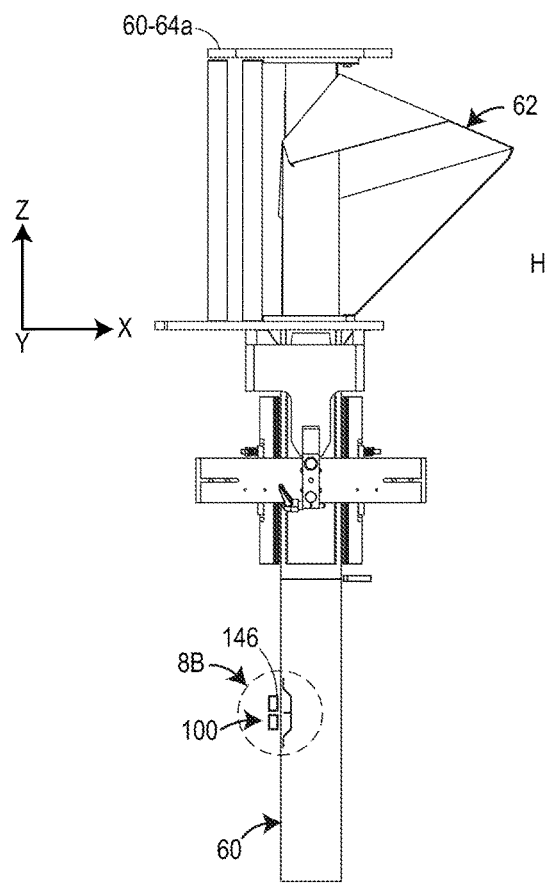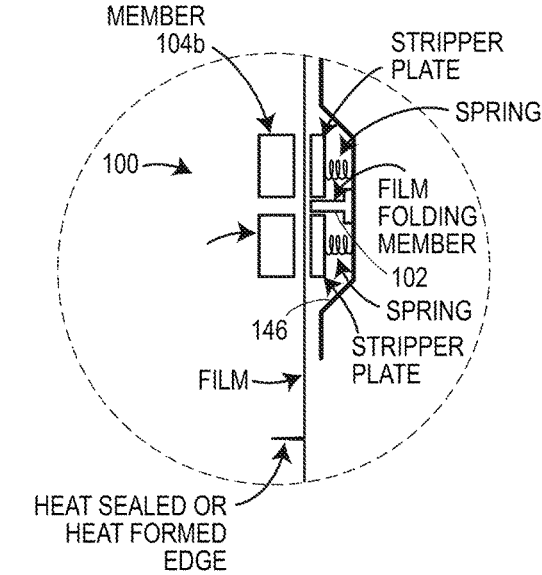
FIG. 8A
FIG. 8B

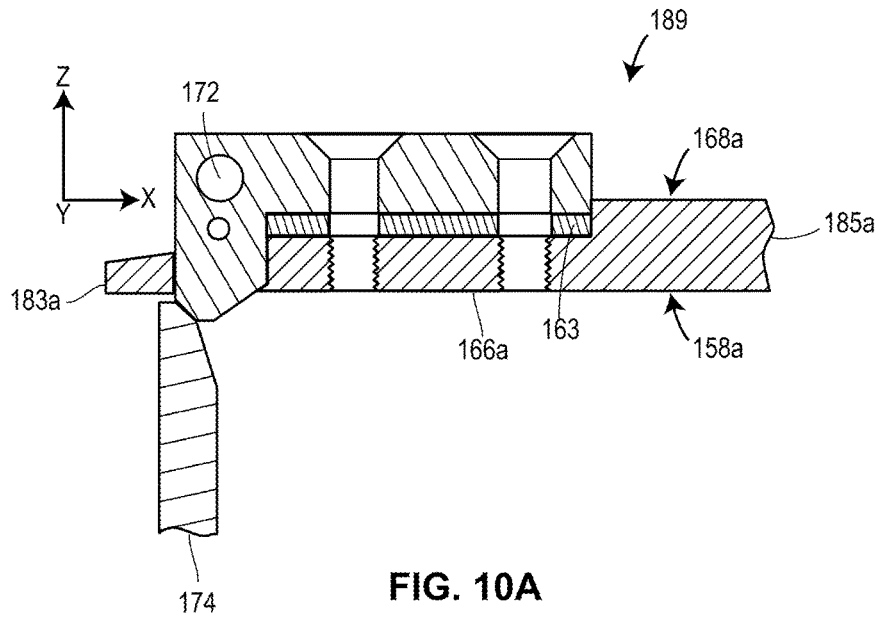
FIG. 10A
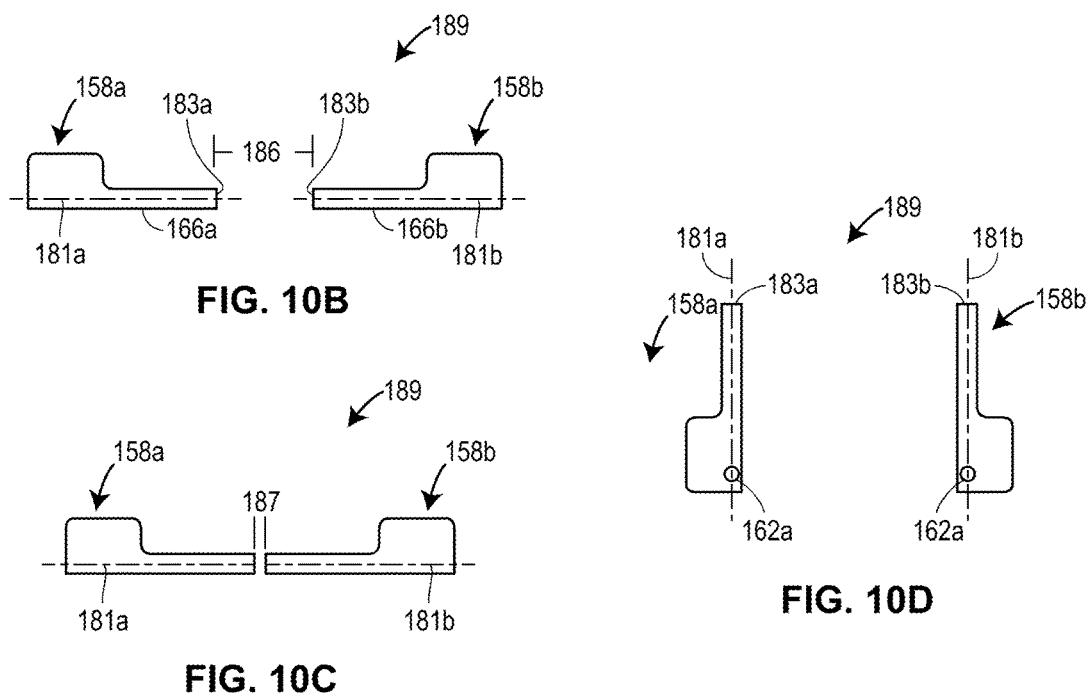
FIG. 10B
FIG. 10C
FIG. 10D

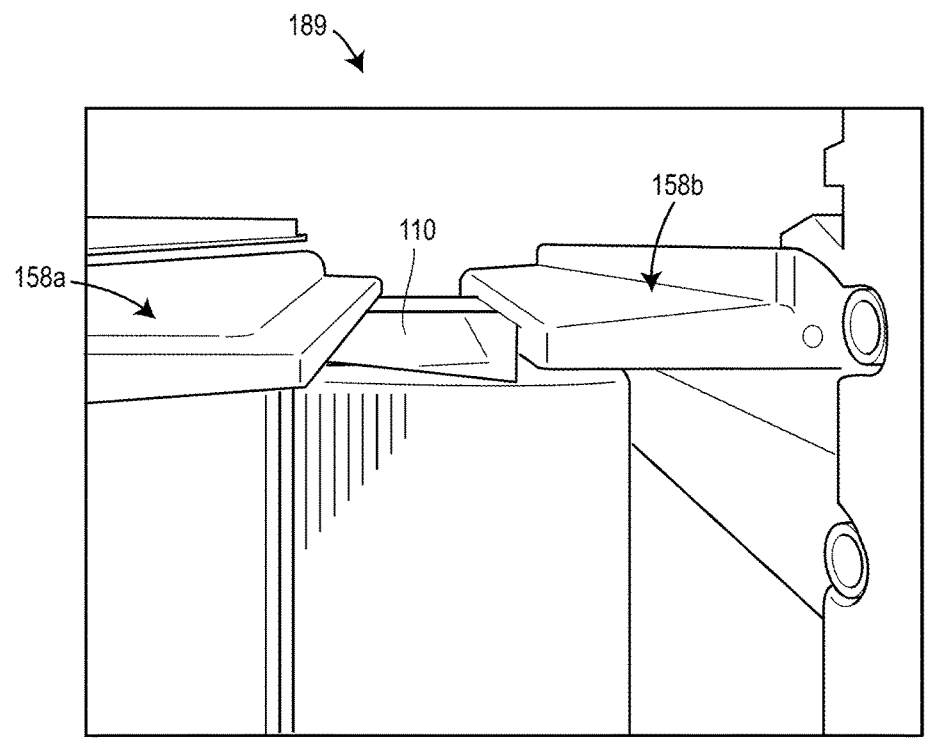
FIG. 12A
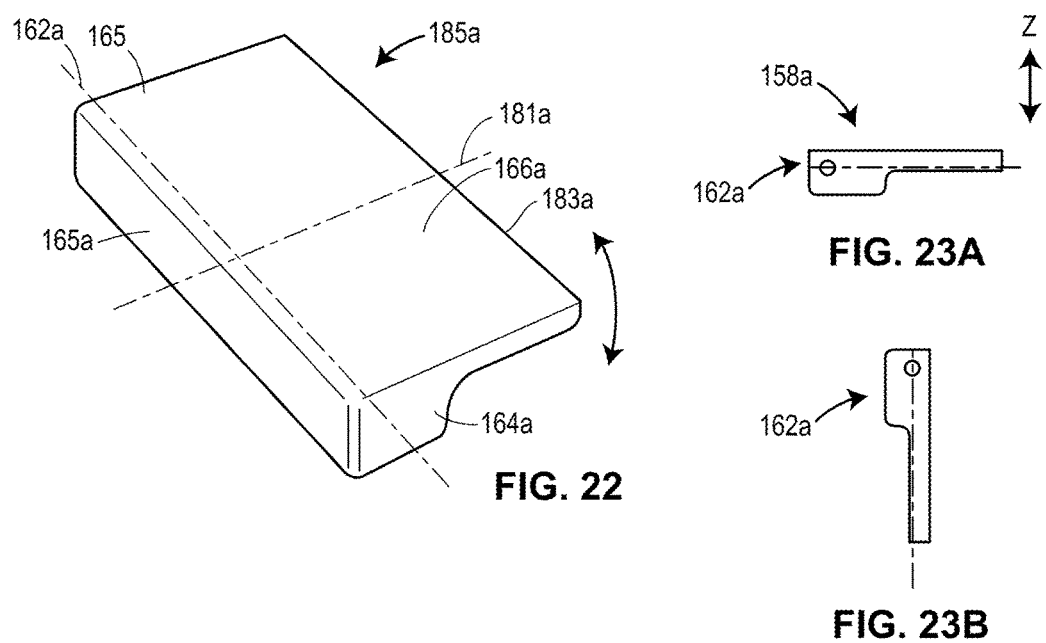
FIG. 22
FIG. 23A
FIG. 23B

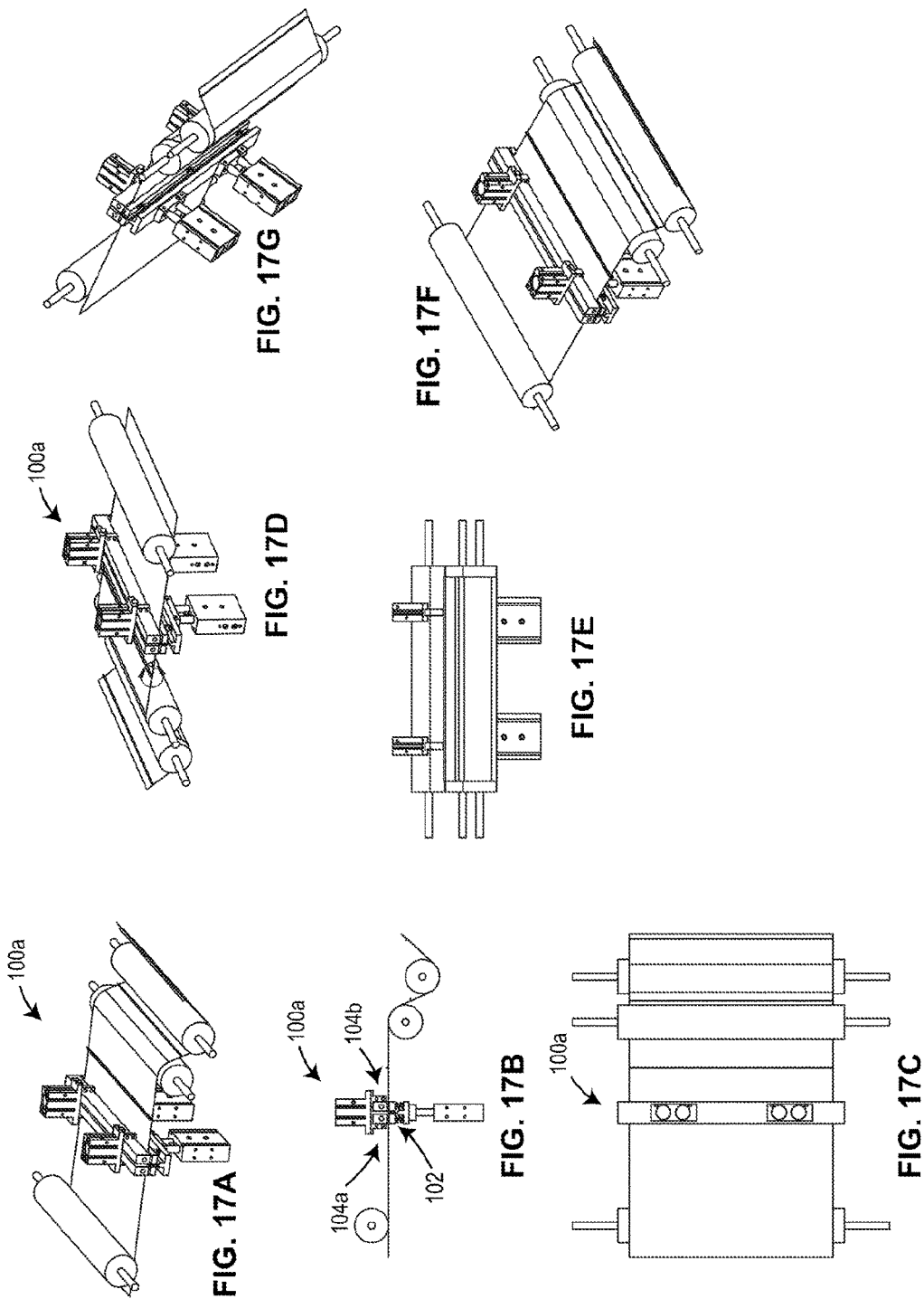

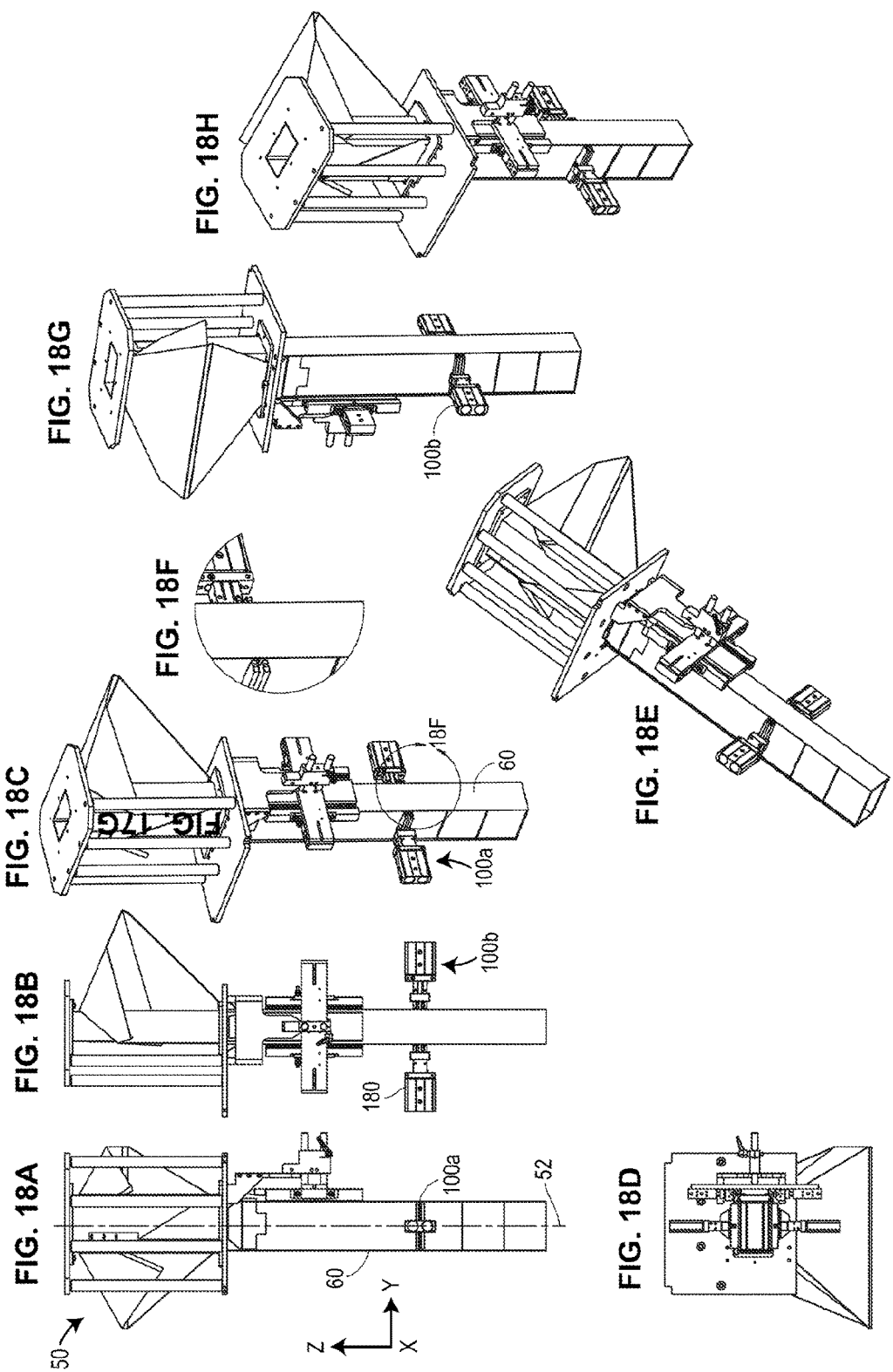

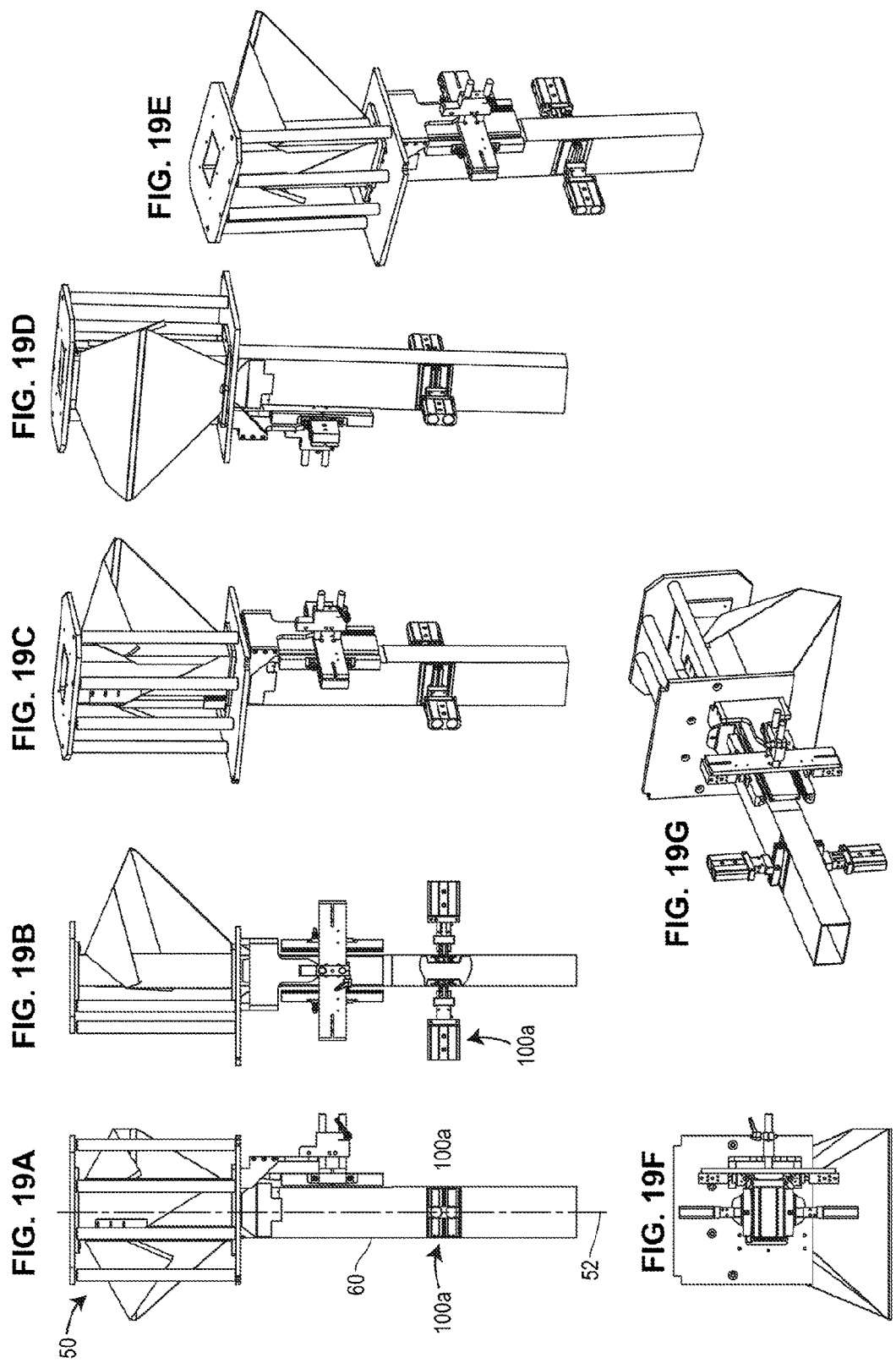

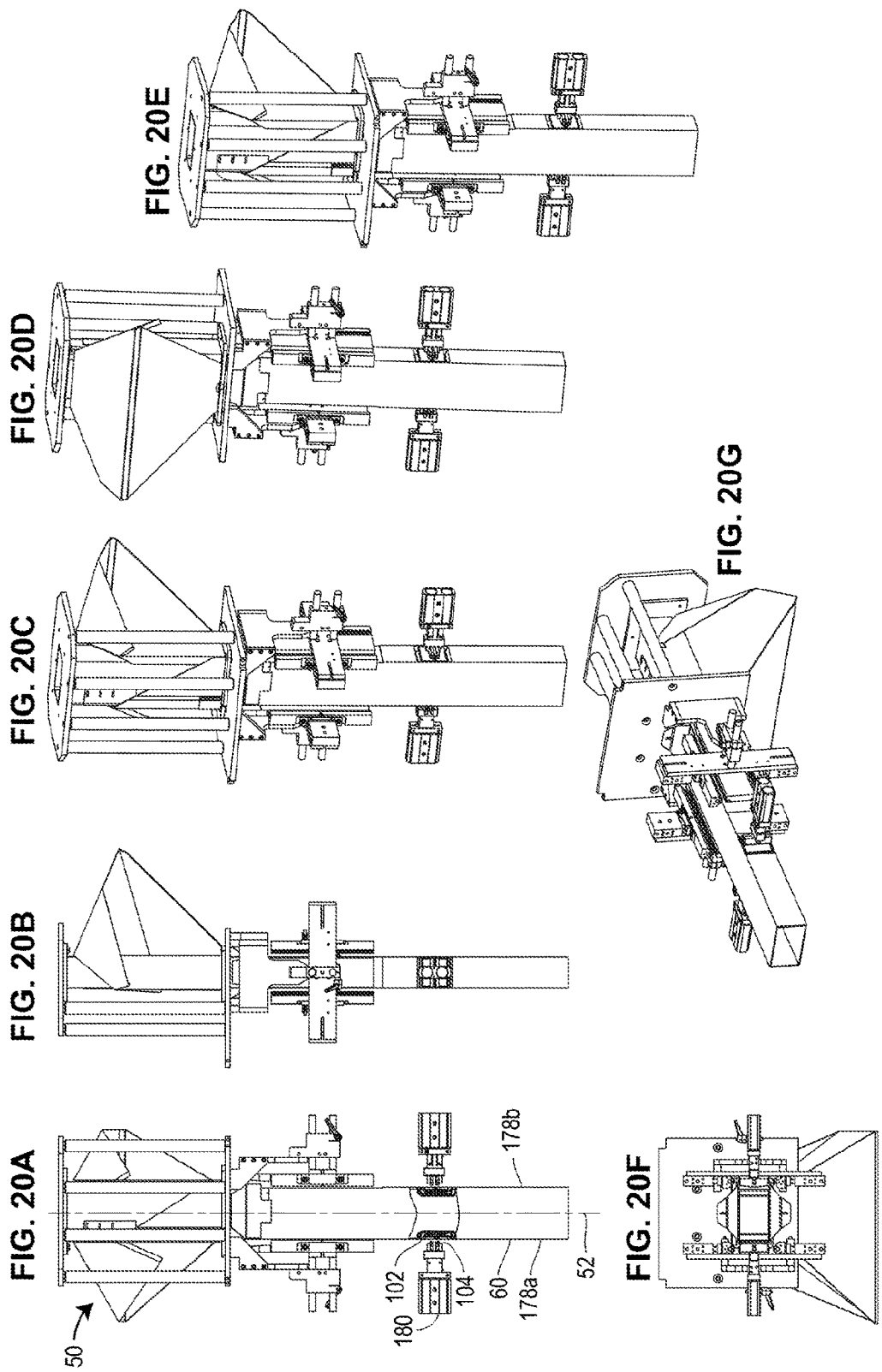

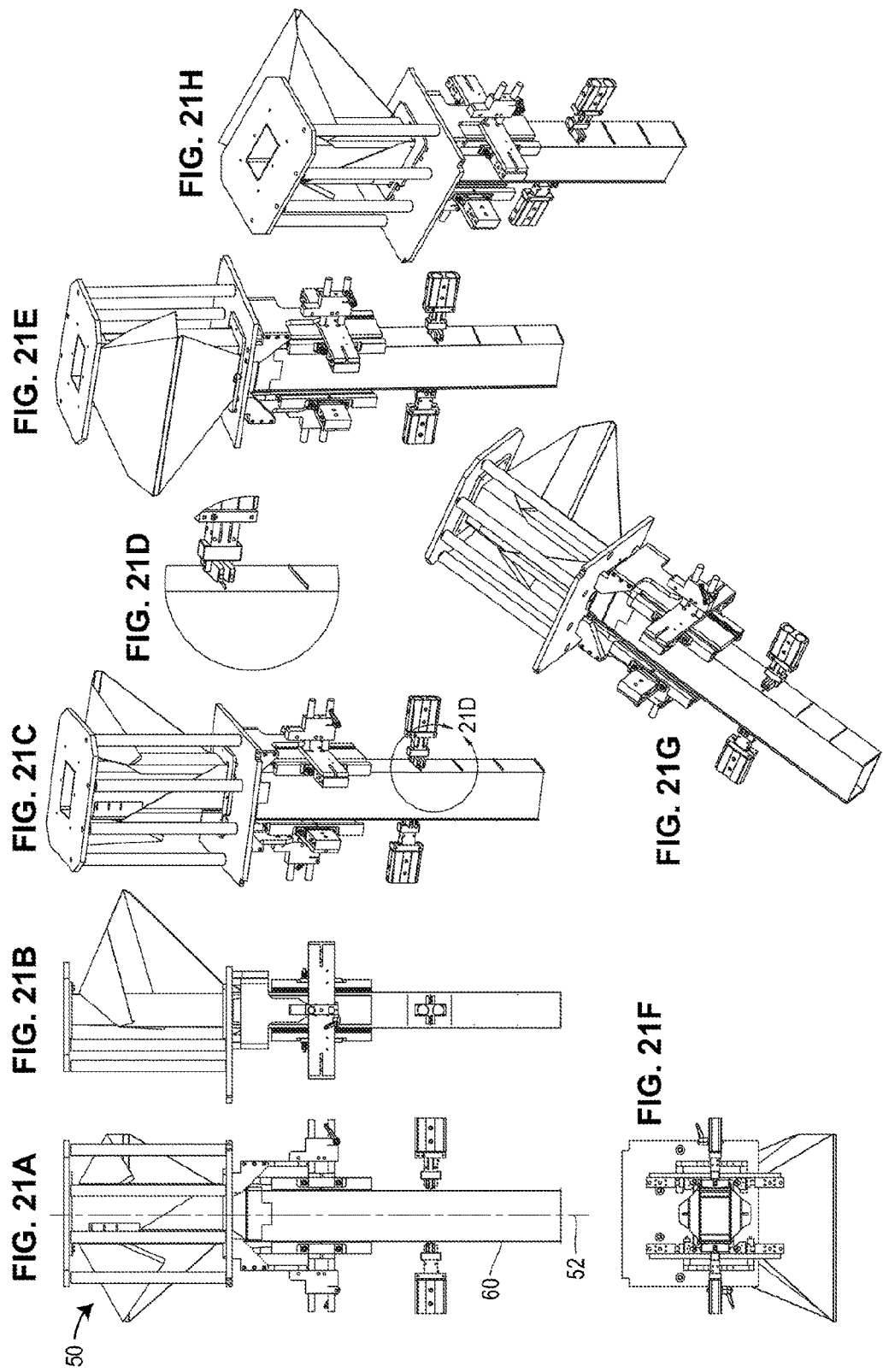

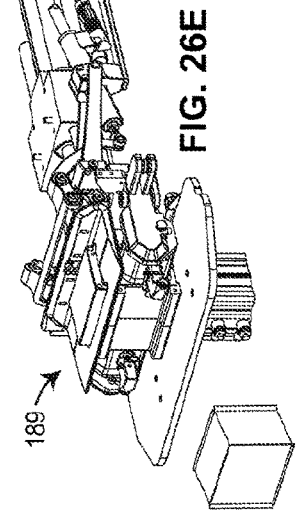
FIG. 26B
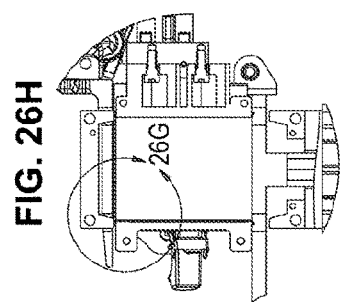
FIG. 26E
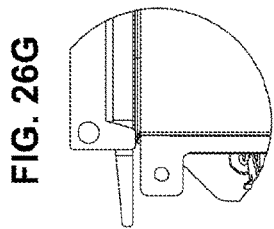
FIG. 26H
FIG. 26G
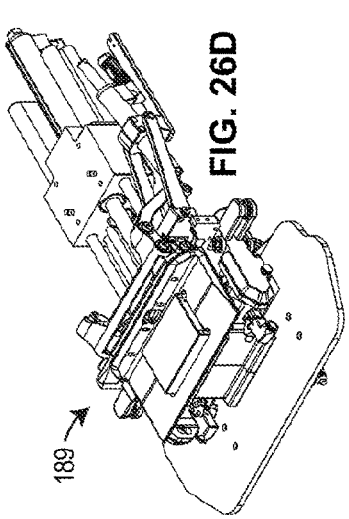
FIG. 26D
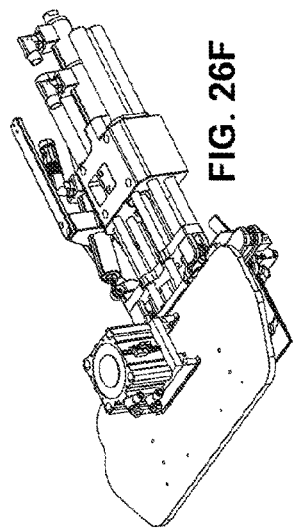
FIG. 26F
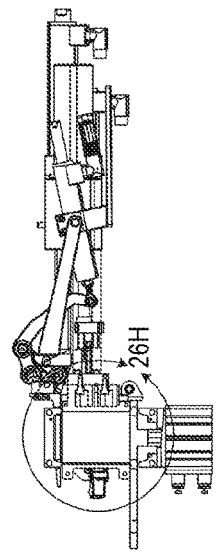
FIG. 26A
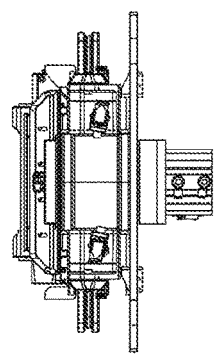
FIG. 26C
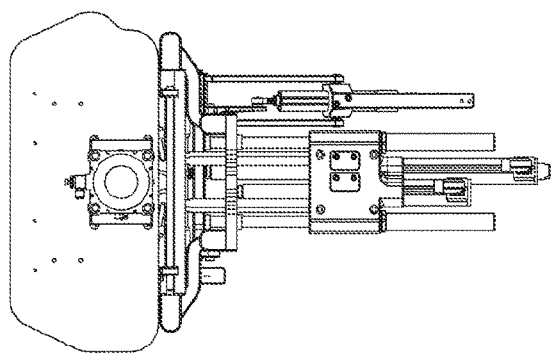

189

APPARATUS TO FORM EDGES IN A PACKAGE MADE OF FLEXIBLE MATERIAL

CROSS-REFERENCE TO RELATED APPLICATION

This application is a U.S. national stage of International Patent Application No. PCT/US2015/020032 filed Mar. 11, 2015, which in turns claims the benefit of priority under 35 U.S.C. § 119(e) of U.S. Provisional Patent Application No. 61/951,493 filed Mar. 11, 2014, the respective disclosures of which are each incorporated herein by reference in their entireties.

FIELD OF THE DISCLOSURE

The disclosure relates to flexible packages and method of making the same, and, in particular, to flexible packages having formed and/or sealed transverse edges and methods of making the same.

BRIEF DESCRIPTION OF RELATED TECHNOLOGY

Vertical form, fill, and seal (VFFS) packaging machines are commonly used in the snack food industry for forming, filling, and sealing bags of nuts, chips, crackers and other products. Such packaging machines take a packaging film or flexible material form a roll and form the flexible material into a vertical tube around a product delivery cylinder. One disadvantage of these packages is that the resulting filled package is not rigid enough to allow the stacking of one package on top of another in a display. Additionally, such conventional packages do not retain their shape, particularly after the package is opened and product is removed.

BRIEF SUMMARY OF THE INVENTION

An apparatus for forming a seal along an edge portion of a flexible package that is made from a sheet of flexible material includes an elongated film folding member extending along a lengthwise axis from a first end to a second end. The lengthwise axis is adapted to be normal to a transport axis of a forming tube used to form the flexible package, and the film folding member extends along a widthwise axis from a first engagement end to a second engagement end, and wherein the widthwise axis is normal to the lengthwise axis. The apparatus also includes at least one heating and/or sealing member, the at least one heating and/or sealing member extending along a first heat/seal axis from a first end to a second end, the first heat/seal axis being parallel to the lengthwise axis of the film folding member. The first engagement end of the film folding member is adapted to contact a portion of the sheet of flexible material during a sealing process and the at least one heating and/or sealing member is adapted to heat the portion of the sheet of flexible material during the sealing process such that the contact between the first engagement end and the portion of the sheet of flexible material creates the seal along the edge portion of the flexible package.

BRIEF DESCRIPTION OF THE DRAWING FIGURES

FIGS. 1A-1F are schematic illustrations of a package in accordance with an embodiment of the disclosure;

FIG. 4 is a schematic drawing of an edge former in accordance with an embodiment of the disclosure;

FIG. 5A is a schematic drawing of a folding member of an edge former having an arcuate profile in accordance with an embodiment of the disclosure;

FIG. 5B is a schematic drawing of a folding member of an edge forming having an arcuate profile with partial segments in accordance with an embodiment of the disclosure.

FIG. 5C is a front view of an embodiment of a folding member of an edge former;

FIG. 5D is a cross-sectional view of the folding member of FIG. 5C taken along line 5C-5C;

FIG. 8A is a schematic drawing of an edge former in accordance with an embodiment of the disclosure;

FIG. 8B is a partial cross-sectional view of an edge former in accordance with an embodiment of the disclosure;

FIG. 10A is a schematic drawing of a second flap folding station in accordance with an embodiment of the disclosure;

FIG. 10B is a side view of an embodiment of the second flap folding station;

FIG. 10C is a side view of the embodiment of the second flap folding station of FIG. 10B;

FIG. 10D is a side view of the embodiment of the second flap folding station of FIG. 10B;

Figure 24A:
Figure 24B:
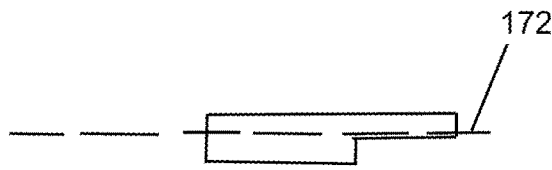
Figure 12C:
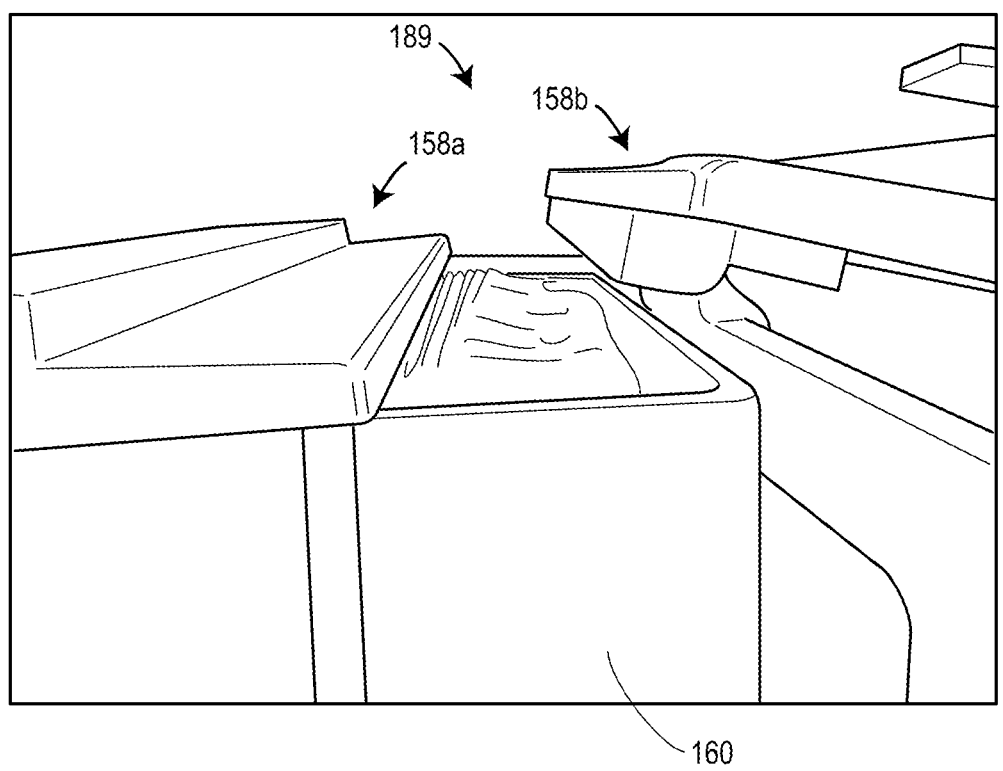
Figure 12D:
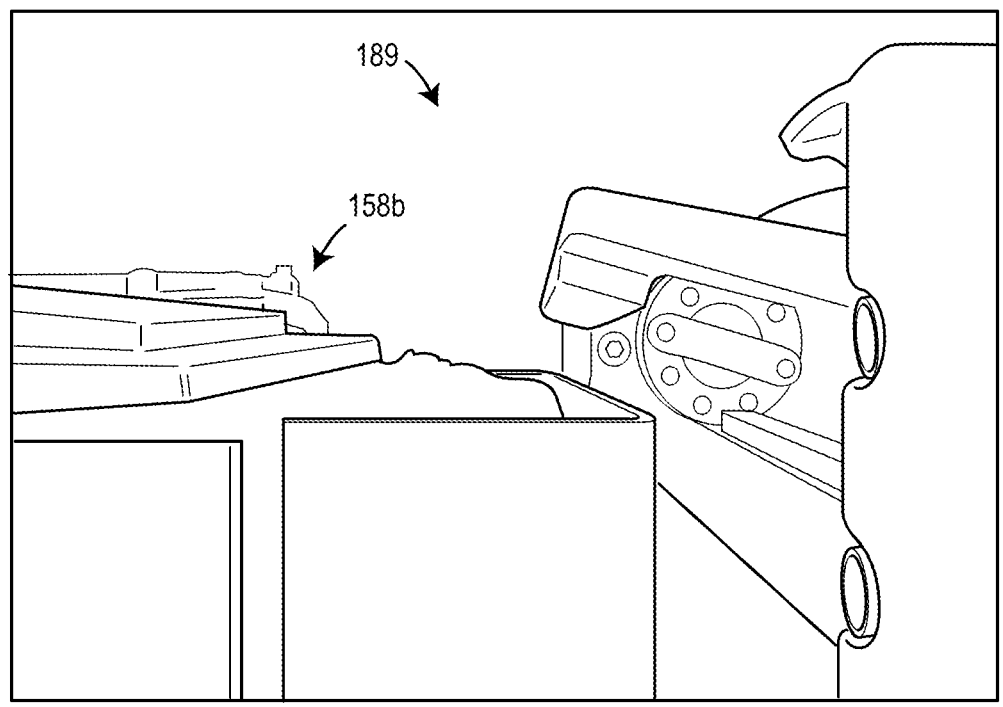
Figure 13A:
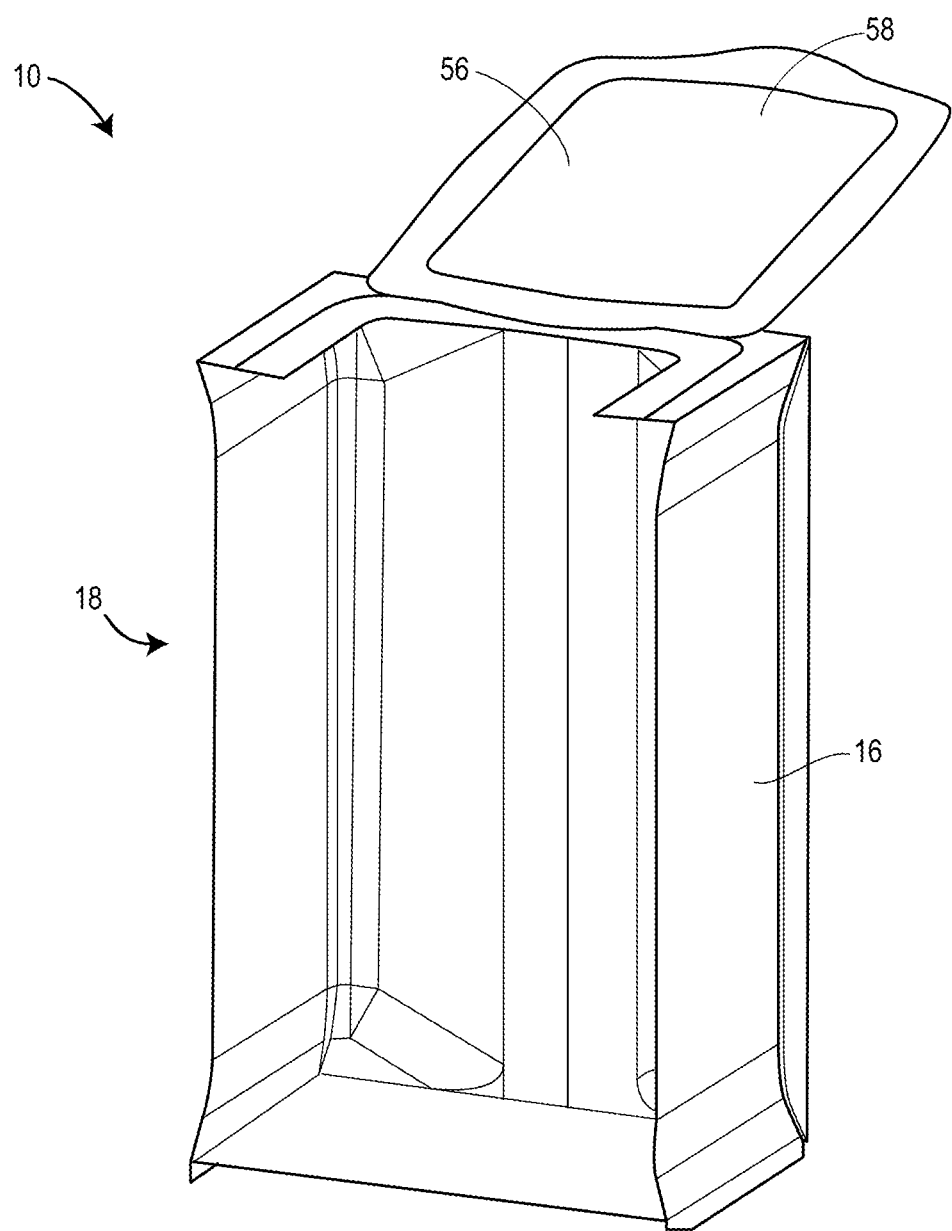
Figure 13B:
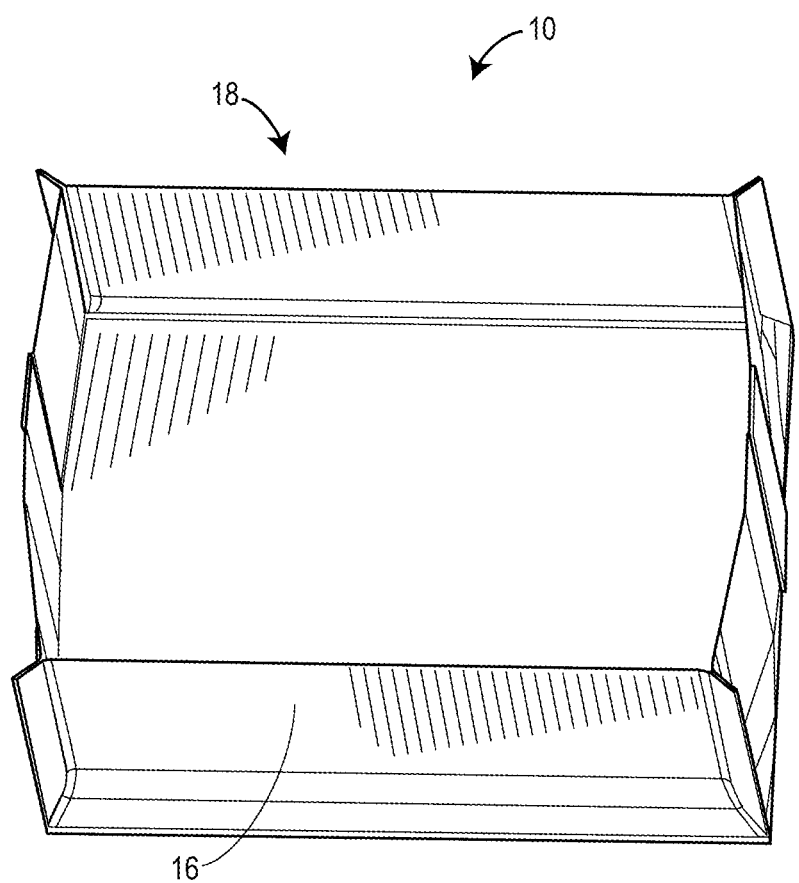
Figure 13C:
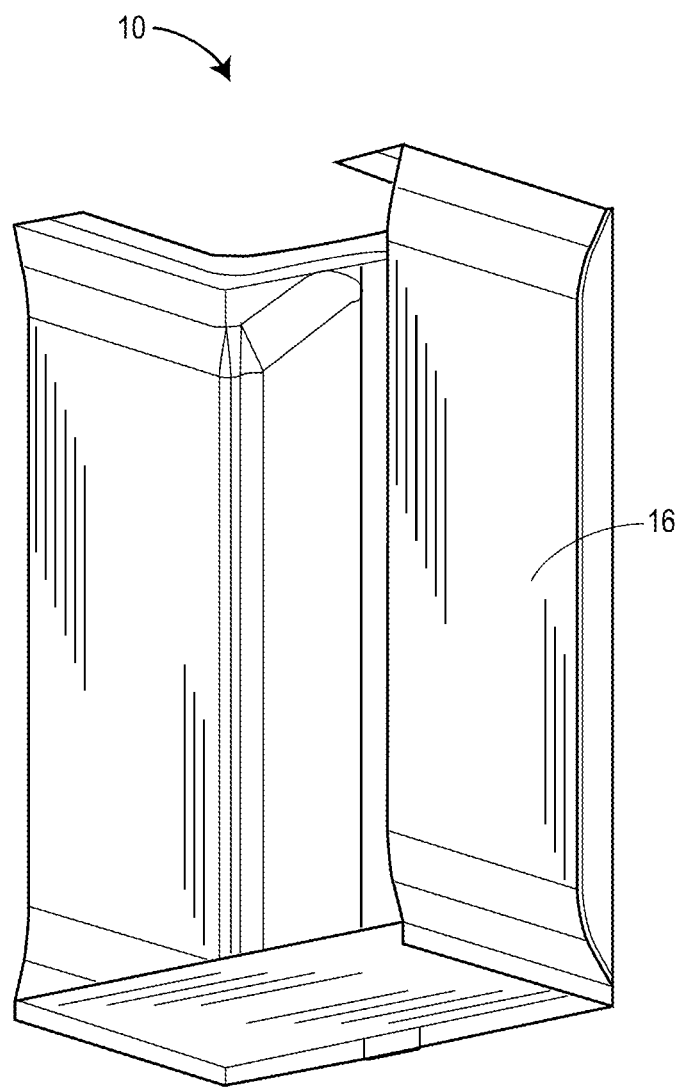
Figure 14:
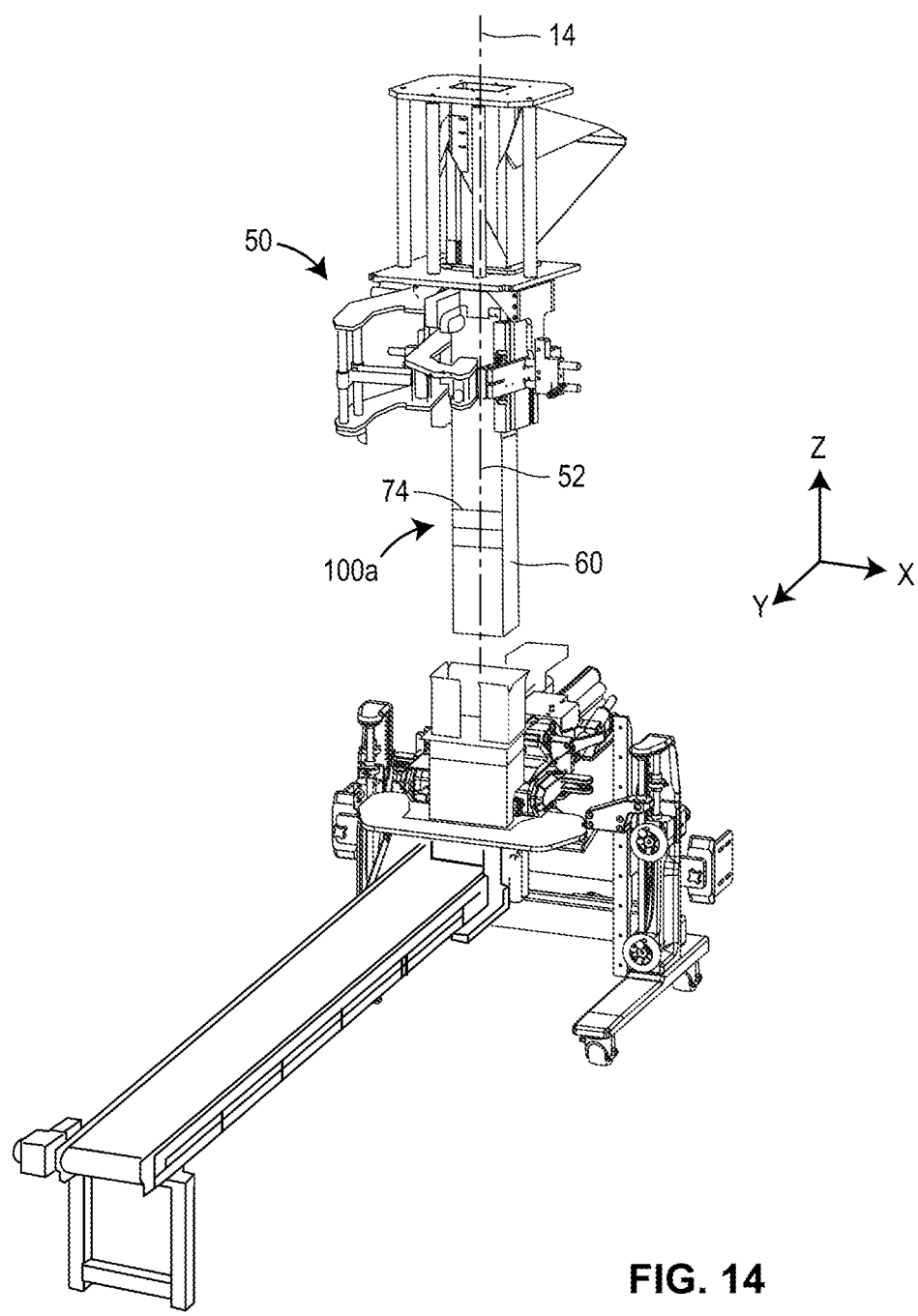
Figure 15:
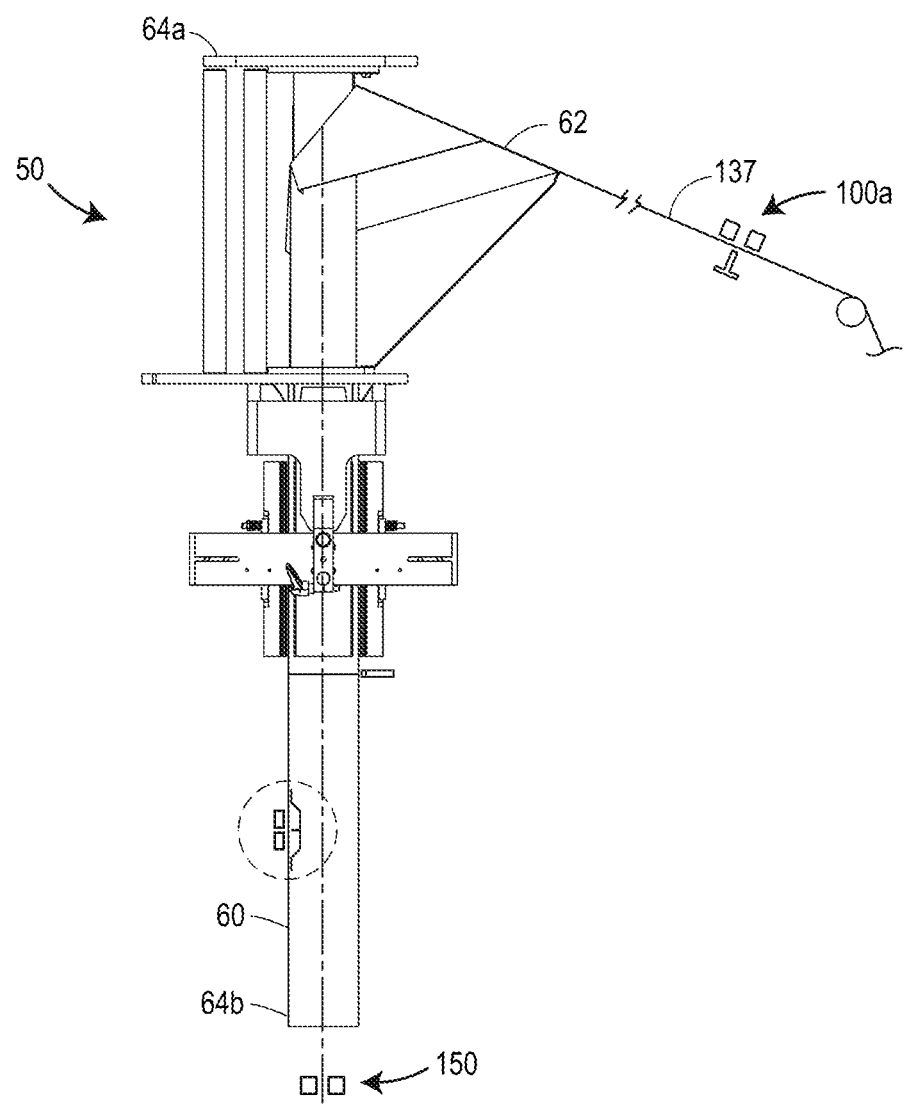
Figure 16:
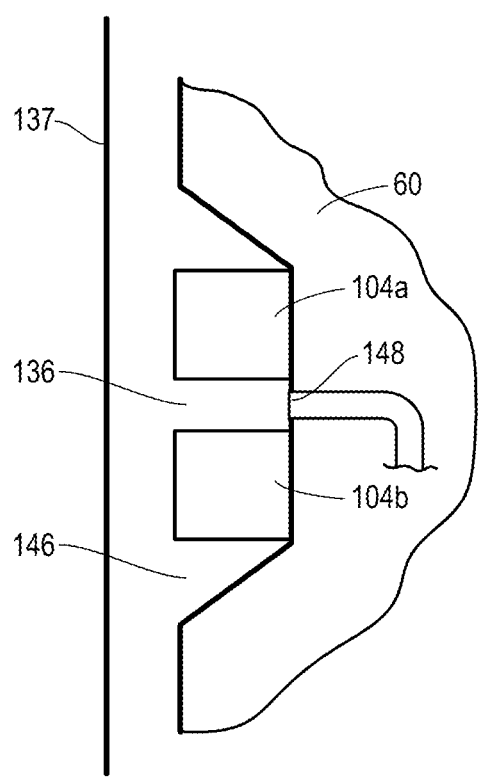
Figure 25A:
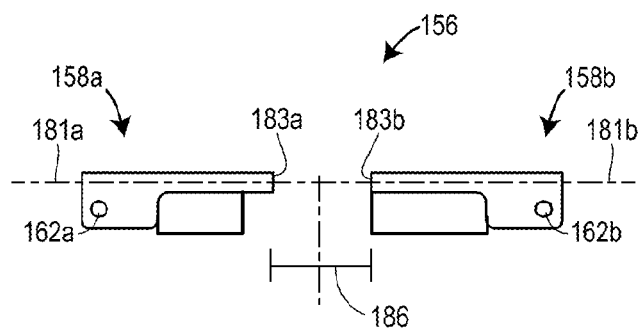
Figure 25B:
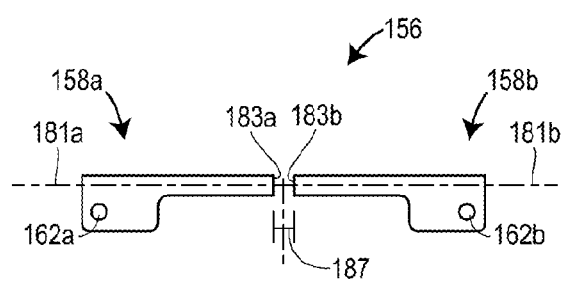
Figure 25C:
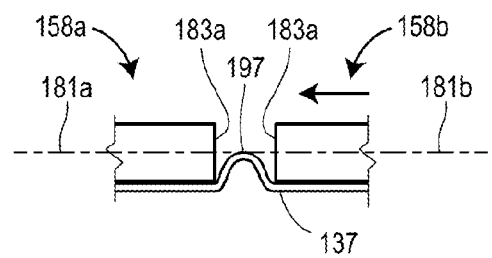
Figure 25D:
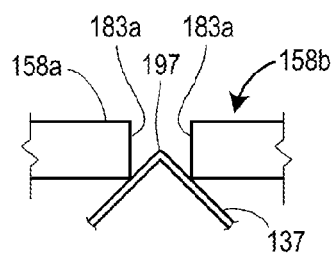
Figure 25E:
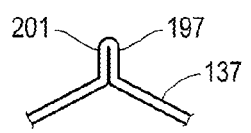
Figures 27C, 27F:
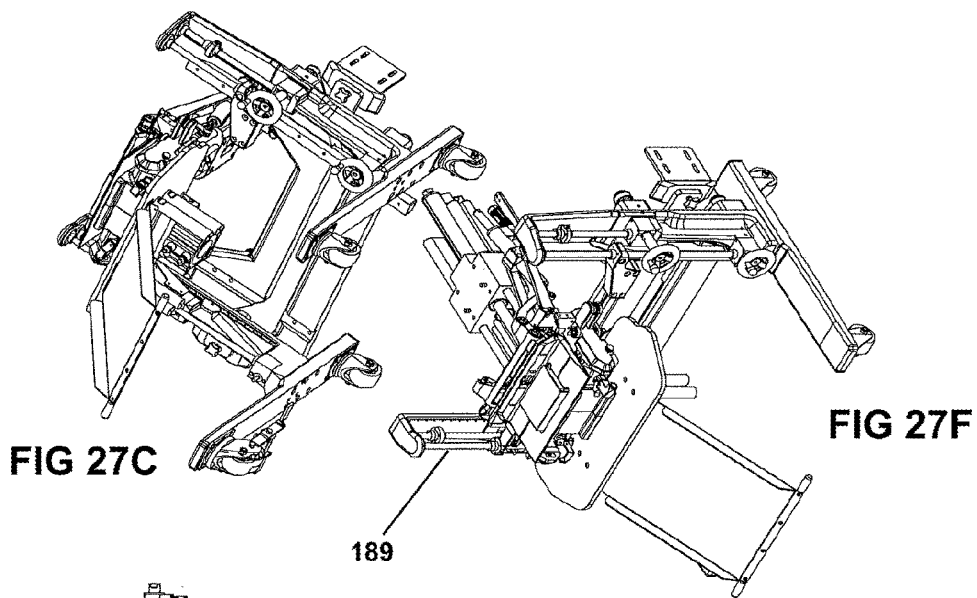
Figures 27B, 27E:
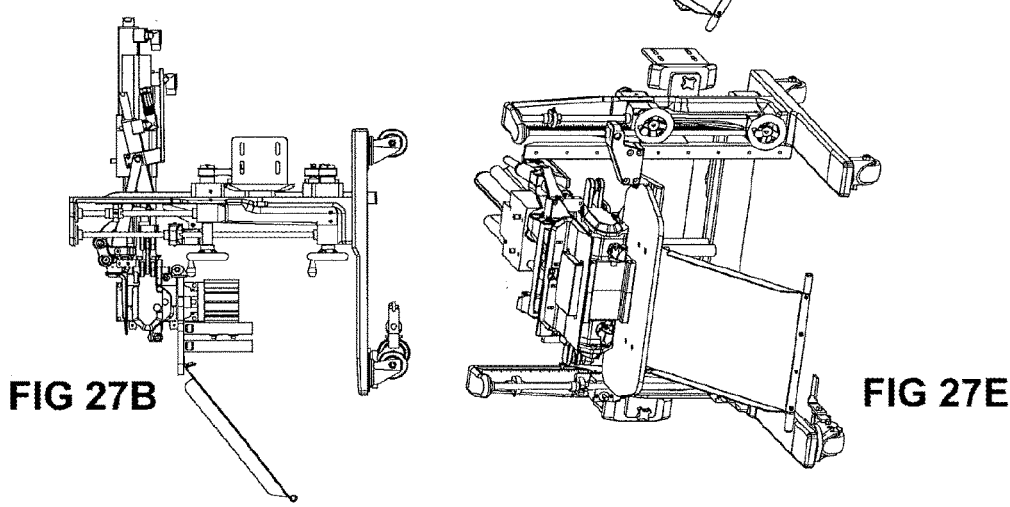
Figures 27A, 27D:
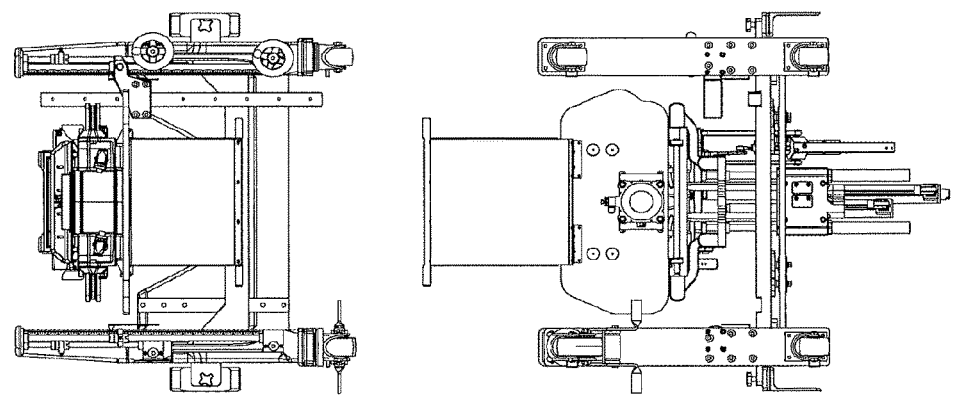

FIGS. 12A-D are perspective views of an embodiment of the second flap folding station in accordance with an embodiment of the disclosure;

FIGS. 13A-C are schematic drawings of cross-sections of a package in accordance with an embodiment of the disclosure;

FIG. 14 is an embodiment of a packaging machine including an embodiment of an edge former;

FIG. 15 is an embodiment of a packaging machine including an embodiment of an edge former;

FIG. 16 is an embodiment of a packaging machine including an embodiment of an edge former;

FIGS. 17A to G are various views of an embodiments of an edge former;

FIG. 18A to 18H are various views of an embodiment of a packaging machine including an embodiment of an edge former;

FIG. 19A to 19G are various views of an embodiment of a packaging machine including an embodiment of an edge former;

FIG. 20A to 20G are various views of an embodiment of a packaging machine including an embodiment of an edge former;

FIG. 21A to 21H are various views of an embodiment of a packaging machine including an embodiment of an edge former;

FIG. 22 is a perspective view of an embodiment of a flap folder;

FIGS. 23A and 23B are various views of an embodiment of a flap folder;

FIGS. 24A and 24B are various views of an embodiment of a flap folder;

FIGS. 25A to 25D are side views of an embodiment of the first flap folding station;

FIG. 25E is a side view of a corner seal formed by the embodiment of a flap folding station;

FIGS. 26A to 26H are various views of a second flap folding station in accordance with an embodiment of the disclosure; and FIGS. 27A to 27F are various views of a second flap folding station in accordance with an embodiment of the disclosure.

DETAILED DESCRIPTION

Disclosed herein is a package formed from a flexible material that has improved rigidity and ability to retain its shape even after product is removed. Also disclosed herein are methods and equipment for forming such packages. The methods in accordance with the disclosure advantageously provides a means of making packages at high rate of speed, while improving the structural rigidity of the packages as compared to conventional packages formed on conventional VFFS packaging machines.

The edge former 100 in accordance with an embodiment of the disclosure can be adapted to function with known packaging machines, including, but not limited to vertical form fill seal (VFFS) packaging machines, horizontal form, fill and seal (HFFS) machines, sequential assembly machines and the like. As used herein, a "transport path" refers to the path of the flexible material as it is transported through the conventional packaging machine during operation for making a flexible package. Also as used herein, a "transport axis" refers to the axis that extends along the transport path of the flexible material as it is transported through the conventional packaging machine during operation for making a flexible package.

In accordance with an embodiment, a package 10 in accordance with the disclosure includes a plurality of panels that cooperate to define an interior volume. Referring to FIGS. 1A to 1F and 13A to 13C, the package 10 can include oppositely disposed first and second panels 12, 14, oppositely disposed third and fourth panels 16, 18, and oppositely disposed fifth and sixth panels 20, 22. The package can further include first, second, third, and fourth longitudinal edges 26, 28, 30, 32 that each extend between the first panel 12 and the second panel 14. In various embodiments of the method of making the package, the first, second, third, and fourth longitudinal edges 26, 28, 30, 32 of the package 10 may be disposed transverse to the transport axis 52 of the transport path of a flexible material through a packaging machine, such as the example packaging machine 50 illustrated in FIG. 14. One or more of the first, second, third, and fourth longitudinal edges 26, 28, 30, 32 can be formed so as to provide sharp edges (or well-defined edges) to the package. In various embodiments, inner portions of the flexible material adjacent to opposed sides of the longitudinal edge 26, 28, 30, 32 can be brought into contact and attached together along all or a portion of the longitudinal edge 26, 28, 30, 32, such as the first longitudinal edge 26 and the second longitudinal edge 28 illustrated in FIG. 3. For example, still referring to FIG. 3, the flexible material adjacent to opposed sides of one or more of the longitudinal edges 26, 28, 30, 32 (e.g., the first longitudinal edge 26 and the second longitudinal edge 28) can be heat sealed along the length of the longitudinal edge 26, 28, 30, 32. In some embodiments, attachment of contacting portions of the flexible material adjacent to opposed sides of the longitudinal edge 26, 28, 30, 32 can impart a contoured shape to the flexible package 10. In other embodiments, additional flexible material can be provided in the panel regions to account for flexible material disposed in the seal so that a contoured shape is not imparted to the package 10.

Figure 2:
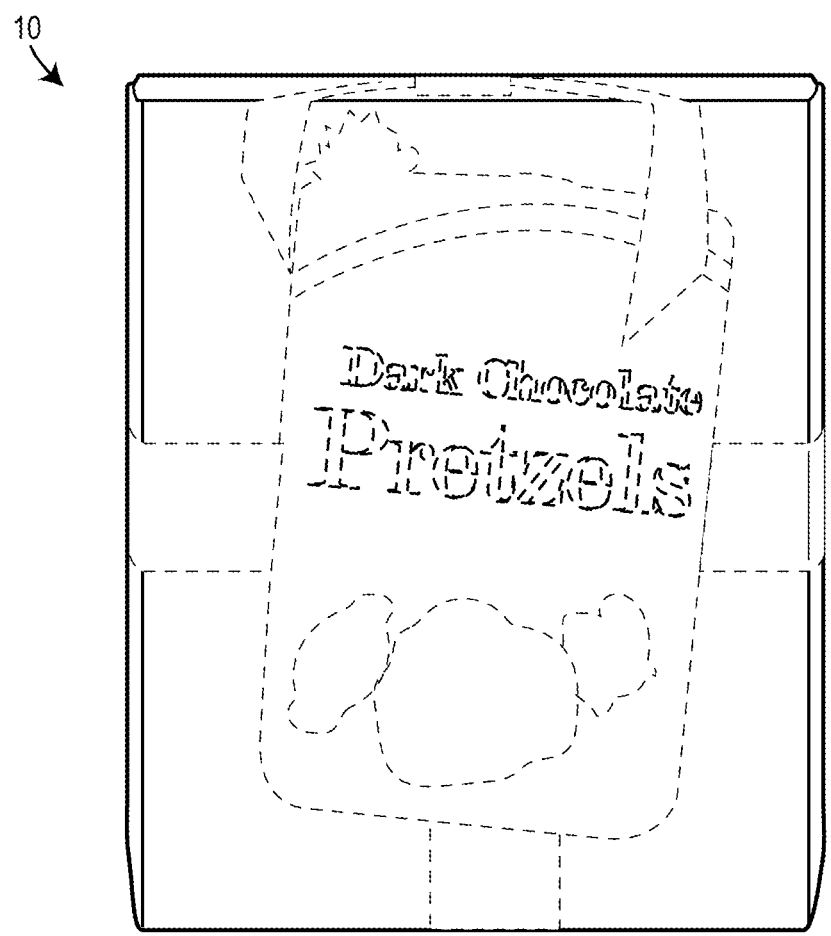
FIG. 2 is a photograph of a package in accordance with an embodiment of the disclosure.
Figure 3:
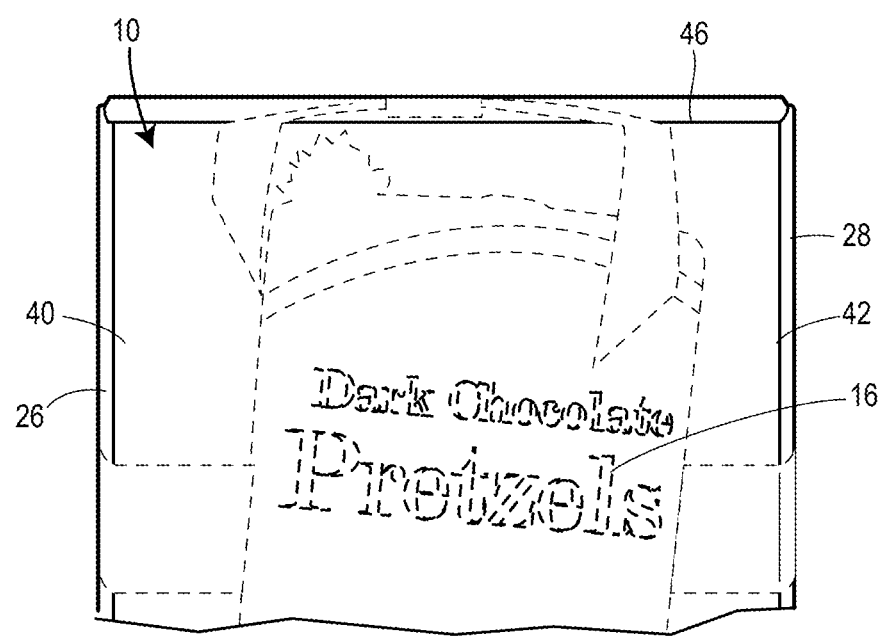
FIG. 3 is a photograph of the package of FIG. 2 showing the formed and sealed edges of the package in accordance with an embodiment of the disclosure.

Referring to FIG. 3, the package can further include attachment of contacting portions of flexible material at other edges of the package 10. For example, FIG. 3 illustrates an embodiment in which contacting portions of flexible material disposed adjacent to opposed sides of an edge 46 extending between the fifth and sixth panels 20, 22. Any one or more of the edges of the package can include attachment of contacting portions of flexible material.

As described in detail below, the package 10 can also be formed by imparting shape memory, for example through the application of heat, into the flexible material to define a crease or a sharper crease at one of more of the longitudinal edges 26, 28, 30, 32 (also referred to herein as formed longitudinal edges). Such processes may not result in the attachment of contacting portions of the flexible materials, but can aid in improving rigidity of the package by imparting a memory or preference of the flexible material to preferentially form the longitudinal edge 26, 28, 30, 32.

The attachment of contacting portions of the flexible material at one or more longitudinal or other edges of the package 10 and/or the imparting of shape memory can aid in improving the rigidity of the package 10 and/or aid in the formation of the package 10 by providing a package that preferentially forms a desired shape. In some embodiments, the package 10 may be a cubed package. In other embodiments, the package 10 may have a trapezoidal shape or a contoured shape, for example.

As previously explained, the processes and equipment described below for making a package 10 having one or more formed longitudinal edges 26, 28, 30, 32 and/or attached or sealed flexible material about one or more of the longitudinal edges 26, 28, 30, 32 can be performed on a variety of known packaging machines, which have been modified with suitable equipment as disclosed herein, including, but not limited to VFFS machines, horizontal-form-fill-seal machines, stand-up pouch type machines, sequential assembly machines, and the like, and combinations thereof. Additionally, the equipment and methods described in detail below can be used with a variety of flexible materials, including flexible materials having multiple sheets. For example, as illustrated in FIG. 1A, the flexible material may include a first sheet 54 for forming the package configuration and a second sheet 56 attached to the first sheet 54. The second sheet 56 can provide a resealable flap 58 covering the opening and/or be disposed on one or more panels 12, 14, 16, 18, 22, which can further improve rigidity. In any of the described embodiments of the machine and method of making, it is contemplated that the longitudinal edge 26, 28, 30, 32 can be formed to preferentially define a longitudinal edge and/or have contacting portions disposed on opposed sides of the longitudinal edge 26, 28, 30, 32. It is also contemplated herein that in any of the described embodiments any suitable number of longitudinal edges 26, 28, 30, 32 can be formed and/or sealed by the described methods and the packaging machines can include any suitable number of (e.g., one or more) edge formers 100. In embodiments including multiple edge formers 100, it is contemplated that the edge formers 100 can operate substantially simultaneous to form and/or seal multiple longitudinal edges 26, 28, 30, 32 substantially simultaneously. In other embodiments, the edge formers 100 may operate sequentially. It is further contemplated herein that combinations of the embodiments of edge formers 100 can be used on a single machine and in a single process. For example, in an embodiment such as that illustrated in FIGS. 15 and 17A to 17E, a first edge former 100a can be provided upstream of a forming tube 60 for forming one longitudinal edge 26, 28, 30, 32 of a package 10 and a second edge former 100b can be provided on the forming tube 60 for further forming the same longitudinal edge 26, 28, 30, 32 or form forming a different longitudinal edge 26, 28, 30, 32. Any suitable combination and number of edge formers 100 can be used. The components of the edge former 100, as illustrated in FIG. 4, may include a folding member 102 and a heating and/or sealing member 104, and these components can be configured to form edges of a variety of shapes, including, linear, curved, complex, and wavy.

Referring again to FIG. 4, an edge former 100 in accordance with embodiments of the disclosure includes the folding member 102 and at least one heating and/or sealing member 104. In some embodiments, the edge former 100 may include a first heating and/or sealing member 104a and a second heating and/or sealing member 104a. In some embodiments, the edge former 100 can include complementary first and second heating and/or sealing members 104a, 104b. One or more edge formers 100 can be designed to attach, for example, heat seal, contacting portions of the flexible material to define one or more longitudinal edge 26, 28, 30, 32 (or other edge) of the package 10, or can impart folding memory to the flexible material, for example, through the application of heat, but not attachment of the contacting portions.

Figure 7A:
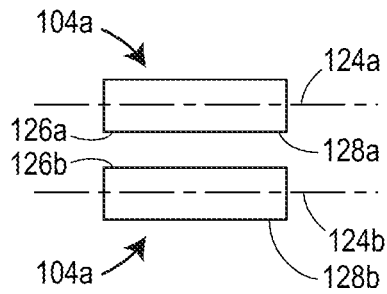
FIG. 7A is a schematic drawing of an edge former in accordance with an embodiment of the disclosure.

The edge former 100 can include a folding member 102 with a desired folding profile and at least one heating and/or sealing member 104 that forms the flexible material around the folding member 102 and applies heat to the flexible material to form the edge (e.g., the longitudinal edge 26, 28, 30, 32). Referring to FIG. 5D, the folding member 102 may extend along a lengthwise axis 108 from a first end 106 to a second end 107, and the lengthwise axis 108 may be parallel to the Y-axis of the reference coordinate system of FIG. 7A and may be perpendicular to the transport axis 52 (see, e.g., FIG. 15). As illustrated in FIG. 5D, the folding member 102 may have a cross-sectional shape (viewed normal to the lengthwise axis 108) that may be elongated and may extend along a widthwise axis 110 from a first engagement end 112 to a second engagement end 113. The widthwise axis 110 may be parallel to the X-axis of the reference coordinate system of FIGS. 7A and 8 and may be perpendicular to the lengthwise axis 108, the transport axis 52 (see, e.g., FIG. 15), and/or the Z-axis of the reference coordinate system of FIGS. 7A and 8. When viewed along the lengthwise axis 108, the folding member 102 may include an engagement portion 114 and a base portion 116. The engagement portion 110 may be planar or substantially planar, and may extend from the first engagement end 112 to a transition point 119 that is disposed between the first engagement end 112 and the second engagement end 113. The base portion 116 may have a tapered portion 121 that may extend from the transition point 119 towards the second engagement end 113. The base portion 116 may also have a bottom portion 117 that extends from the widest part of the tapered portion 121 to the second engagement end 113, and the bottom portion 117 may have a cross-sectional width 118 that may be constant or substantially constant and that may be greater than a cross-sectional width 120 of the engagement portion 114. One skilled in the art would recognize that the orientations relative to the reference coordinate system of FIGS. 7A and 8 are provided for reference purposes only, and the lengthwise axis 108 may be parallel to the X-axis, the Z-axis, or disposed at an oblique angle relative to any or all of the X-axis, the Y-axis, and the Z-axis. Similarly, the widthwise axis 110 may be parallel to the Y-axis, the Z-axis, or disposed at an oblique angle relative to any or all of the X-axis, the Y-axis, and the Z-axis.

The cross-sectional shape of the engagement portion 110 may be constant over the lengthwise axis 108 or may vary along the lengthwise axis 108. The shape of a perimeter edge 109 defining the first engagement end 112 when viewed normal to both the lengthwise axis 108 and the widthwise axis 110 may comprise the folding profile 122, as illustrated in FIG. 5A. In some embodiments, the folding profile 122 may have a shape that may be (or may substantially be) linear, arcuate (illustrated in FIGS. 5A and 5B), curved, complex, wavy, and combinations thereof. Other shapes are also contemplated. As illustrated in FIG. 5B, the folding profile 122 may include one or more gaps 123 or spaces between adjacent portions of the first engagement end 112 to facilitate the sealing of the flexible material. The heating and/or sealing member 104 may have a profile that is complimentary to the folding profile 122 of the folding member 102 or it may have a different profile.

In some embodiments, the heating and/or sealing member 104 can be provided to form a seal at the longitudinal edge 26, 28, 30, 32 of the package 10. In the transport path of flexible film in embodiments of the method, the seal or formed longitudinal edge 26, 28, 30, 32 is a seal or formed edge that is transverse to the transport path (or the transport axis 52). In an embodiment, the heating and/or sealing member 104 can form the flexible material around the folding member 102 and then attaches the contacting portions of the flexible material together. For example, the heating and/or sealing member 104 can be a heating and sealing member and the contacting portions of the flexible material can be heat sealed together.

In some embodiments, such as that illustrated in FIG. 7A, the at least one heating and/or sealing member 104 may include a first heating and/or sealing member 104a and a second heating and/or sealing member 104b. The first heating and/or sealing member 104a may extend along a first heat/seal axis 124a from a first end 126a to a second end 128a, and the first heat/seal axis 124a may be parallel to and offset from the lengthwise axis 108 of the folding member 102. A distance from the first end 126a and the second end 128a of the first heating and/or sealing member 104a may be greater than or equal to a distance from the first end 106 and the second end 107 of the folding member 102. In some embodiment, the first end 126a of the first heating and/or sealing member 104a extends up to or beyond the first end 106 of the folding member 102 and the second end 130a of the first heating and/or sealing member 104a extends up to or beyond the second end 107 of the folding member 102. In some embodiments, the first end 126a of the first heating and/or sealing member 104a does not extend up to the first end 106 of the folding member 102 and the second end 128a of the first heating and/or sealing member 104a does not extend up to the second end 107 of the folding member 102.

Figure 7B:
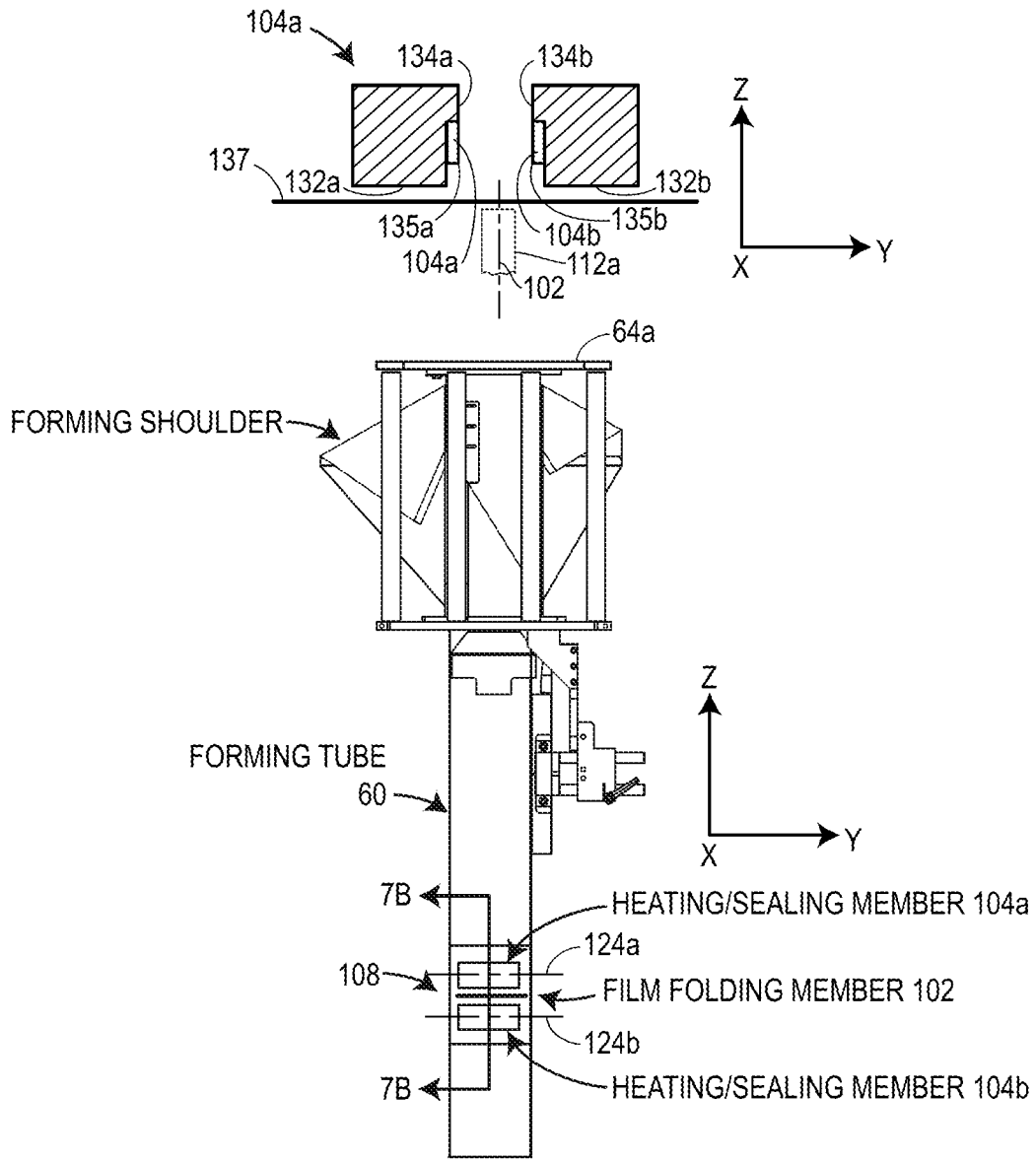
FIG. 7B is a cross-sectional view of an edge former in accordance with an embodiment of the disclosure.

Referring to FIG. 7B, which is a cross-sectional view of the first heating and/or sealing member 104a viewed along the first heat/seal axis 124a, the first heating and/or sealing member 104a may have a bottom surface 132a that may be planar and may be disposed in a plane perpendicular (or substantially perpendicular) to the widthwise axis 108 of the folding member 102 and parallel to a plane formed by the sheet 137 of flexible material as along a portion of the transport path adjacent to the edge former 100. For example, the bottom surface 132a may be parallel to the X-Y plane of the reference coordinate system of FIG. 7B. The bottom surface 132a may also be disposed at an oblique angle relative to a reference plane perpendicular to the widthwise axis 108 of the folding member 102.

The first heating and/or sealing member 104a may also have an inside surface 134a that may be planar and may be disposed perpendicular to the bottom surface 132a in a plane that extends parallel (or substantially parallel) to the widthwise axis 108 of the folding member 102. For example, the inside surface 134a may be parallel to the Y-Z plane of the reference coordinate system of FIG. 7B.

A profile of the first heating and/or sealing member 104a may be complementary to the folding profile 122 of the folding member 102. For example, as illustrated in FIG. 7B, the inside surface 134a may have a recess 135a that may conform in shape to the engagement portion 114 of the folding member 102, and a top edge 140a of the recess 135a may conform in shape to the folding profile 122 of the folding member 102. Accordingly, when a portion (e.g., a first lateral portion) of the engagement portion 114 of the folding member 102 is received into the recess 135a, the top edge 140a of the recess 135a may be slightly outwardly offset from the folding profile 122 (perimeter edge 109) of the engagement portion 114 folding member 102. The outward offset of the top edge 140a of the recess 135a from the folding profile 122 may accommodate sheet thickness or other clearance requirements.

Referring to FIG. 7A, the second heating and/or sealing member 104b may extend along a second heat/seal axis 124b from a first end 126b to a second end 128b, and the second heat/seal axis 124b may be parallel to and offset from first head/seal axis 124a and the lengthwise axis 108 of the folding member 102. A distance from the first end 126b and the second end 128b of the second heating and/or sealing member 104b may be greater than or equal to a distance from the first end 106 and the second end 107 of the folding member 102. In some embodiment, the first end 126b of the second heating and/or sealing member 104b extends up to or beyond the first end 106 of the folding member 102 and the second end 130b of the second heating and/or sealing member 104b extends up to or beyond the second end 107 of the folding member 102. In some embodiments, the first end 126b of the second heating and/or sealing member 104b does not extend up to the first end 106 of the folding member 102 and the second end 128b of the second heating and/or sealing member 104b does not extend up to the second end 107 of the folding member 102.

Referring to FIG. 7B, which is a cross-sectional view of the second heating and/or sealing member 104b viewed along the second heat/seal axis 124b, the second heating and/or sealing member 104b may have a bottom surface 132b that may be planar and may be disposed in a plane perpendicular (or substantially perpendicular) to the widthwise axis 108 of the folding member 102 and parallel to the plane formed by the sheet 137 of flexible material as along a portion of the transport path adjacent to the edge former 100. For example, the bottom surface 132b may be parallel to the X-Y plane of the reference coordinate system of FIG. 7B. The bottom surface 132a may also be disposed at an oblique angle relative to a reference plane perpendicular to the widthwise axis 108 of the folding member 102. The bottom surface 132b may be aligned with the bottom surface 132a of the first heating and/or sealing member 104a such that a distance between the sheet 137 and the bottom surface 132a of the first heating and/or sealing member 104a is equal to or substantially equal to the distance between the sheet 137 and the bottom surface 132b of the second heating and/or sealing member 104b.

The second heating and/or sealing member 104b may also have an inside surface 134b that may be planar and may be disposed perpendicular to the bottom surface 132b in a plane that extends parallel (or substantially parallel) to the widthwise axis 108 of the folding member 102. For example, the inside surface 134a may be parallel to the Y-Z plane of the reference coordinate system of FIG. 7B. The inside surface 134b of the second heating and/or sealing member 104b may be parallel to and may be opposed to the inside surface 134a of the first heating and/or sealing member 104a such that a gap 136 may be formed between the inside surface 134b of the second heating and/or sealing member 104b and the inside surface 134a of the first heating and/or sealing member 104a.

As illustrated in FIG. 7B, the inside surface 134b may have a recess 135b that may conform in shape to the engagement portion 114 of the folding member 102, and a top edge 140b of the recess 135b may conform in shape to the folding profile 122 of the folding member 102. Accordingly, when a portion (e.g., a second lateral portion) of the engagement portion 114 of the folding member 102 is received into the recess 135b, the top edge 140b of the recess 135b may be slightly outwardly offset from the folding profile 122 (perimeter edge 109) of the engagement portion 114 folding member 102. The outward offset of the top edge 140b of the recess 135b from the folding profile 122 may accommodate sheet thickness or other clearance requirements.

In operation, the first heating and/or sealing member 104a and/or the second heating and/or sealing member 104b may heat the portion of the sheet 137 adjacent to the first heating and/or sealing member 104a and/or the second heating and/or sealing member 104b. In some embodiments, the sheet 137 may be stationary during heating by the first heating and/or sealing member 104a and/or the second heating and/or sealing member 104b. Alternatively, in continuous motion machines, the first heating and/or sealing member 104a and/or the second heating and/or sealing member 104b may displace along the transport path at the same velocity as the portion of the sheet 137 to heat the portion of the sheet 137 as the sheet 137 displaces, thereby increasing the production speed of the sealing process.

After the portion of the sheet 137 is suitably heated, the folding member 102 may linearly displace (relative to the first heating and/or sealing member 104a and the second heating and/or sealing member 104b) along the widthwise axis 110 in a first direction towards the sheet 137 and the first engagement end 112 of the engagement portion 114 of the folding member 102 may contact the portion of the sheet 137. As the folding member 102 continues to displace along the widthwise axis 110, the first engagement end 112 of the engagement portion 114 advances into the gap 136. When (or as) the first engagement end 112 of the engagement portion 114 is suitably disposed within the gap 136, the first heating and/or sealing member 104a and the second heating and/or sealing member 104b each displaces towards the engagement portion 114 (or towards the widthwise axis 110) such that each of the inside surfaces 134a, 134b contacts portions of the sheet 137 adjacent to the portion of the sheet contacted by the first engagement end 112. After (or during)

contact between the inside surfaces 134a, 134b and the portions of the sheet 137, the folding member 102 may linearly displace along the widthwise axis 110 in a second direction opposite the first direction. The displacement of the folding member 102 may occur during the displacement of the first heating and/or sealing member 104a and the second heating and/or sealing member 104b or may occur prior to and/or after the displacement of the first heating and/or sealing member 104a and the second heating and/or sealing member 104b. In some embodiments, the displacement of the folding member 102 may be coordinated with the displacement of the first heating and/or sealing member 104a and the second heating and/or sealing member 104b such that the folding member 102 displaces at the same time as the first heating and/or sealing member 104a and/or the second heating and/or sealing member 104b. The sheet may be clamped to prevent undesired movement of the sheet during heating or sealing, but the clamping force may be regulated to not cause damage to the sheet. For example, springs secured to one or all of the folding member 102, the first heating and/or sealing member 104a, and the second heating and/or sealing member 104b may adjust or regulate clamping forces. Continued contact between each of the inside surfaces 134a, 134b and portions of the sheet 137 creates a seal along what will be an edge portion (e.g., a longitudinal edge 26, 28, 30, 32) of the package 10.

In other embodiments, after the portion of the sheet 137 is suitably heated, the first heating and/or sealing member 104a and the second heating and/or sealing member 104b may linearly displace (relative to the folding member 102, which may be stationary) along the widthwise axis 110 of the folding member in a first direction towards the sheet 137. The bottom surface 132a, 132b of each of the first heating and/or sealing member 104a and the second heating and/or sealing member 104b may each contact portions of the sheet 137 and may displace the sheet 137 such that the first engagement end 112 of the engagement portion 114 of the folding member 102 may contact the portion of the sheet 137 that is to be sealed. As the first heating and/or sealing member 104a and the second heating and/or sealing member 104b continues to displace along the widthwise axis 110, the first engagement end 112 of the engagement portion 114 advances into the gap 136. When (or as) the first engagement end 112 of the engagement portion 114 is suitably disposed within the gap 136, the first heating and/or sealing member 104a and the second heating and/or sealing member 104b each displace towards the engagement portion 114 (or the widthwise axis 110) such that each of the inside surfaces 134a, 134b contacts portions of the sheet 137 adjacent to the portion of the sheet contacted by the first engagement end 112. After (or during) contact between the inside surfaces 134a, 134b and the portions of the sheet 137, the first heating and/or sealing member 104a and the second heating and/or sealing member 104b may linearly displace along the widthwise axis 110 in a second direction opposite the first direction, and the portions of the sheet 137 to be sealed are pinched by the inside surfaces 134a, 134b and retained therebetween. The sheet may be clamped to prevent undesired movement of the sheet during heating or sealing, but the clamping force may be regulated to not cause damage to the sheet. For example, springs secured to one or all of the folding member 102, the first heating and/or sealing member 104a, and the second heating and/or sealing member 104b may adjust or regulate clamping forces. Continued contact between each of the inside surfaces 134a, 134b and portions of the sheet 137 creates a seal along what will be an edge portion (e.g., a longitudinal edge 26, 28, 30, 32) of the package 10. The first and second heating and/or sealing member 104a, 104b may be actuated, for example, by linear or rotary pneumatics or by linear or rotary motors or servos. The folding member 102 may be actuated, for example, by linear or rotary pneumatics or by linear or rotary motors or servos.

Referring to FIG. 4A, the edge former 100 may include at least one stripper plate 138 which can keep the film from sticking to the folding member. In some embodiments, the edge former 100 may include a first stripper plate 138a and a second stripper plate 138b disposed on an opposite side of the folding member 102. The stripper plates 138a, 138b can be spring loaded (e.g., by a spring 139a, 139b) and/or may be actuated. In operation, when the first engagement end 112 of the engagement portion 114 of the folding member 102 may contact a portion of the sheet 137 (either by longitudinal displacement of the folding member 102 towards the sheet 137 or my displacement of the sheet 137 towards the folding member 102), the at least one stripper plate 138 (e.g., the first stripper plate 138a) may apply a force to the sheet 137 (e.g., a force provided by the spring 139a) that may act to disengage (or assist in disengaging) the sheet 137 from the engagement portion 114 of the folding member 102.

Referring to FIG. 5B, the folding member 102 may include partial segments of the folding profile 122 (i.e., gaps 123 in the folding profile 122) and have open portions 123 along the folding profile 122, which can allow the heating and/or sealing member to heat and/or seal through the open portions of the folding member 102. The heating and/or sealing may include partial segments of the heating and/or sealing profile and include open portions in which heating or sealing along the profile is not performed.

Figure 6A:
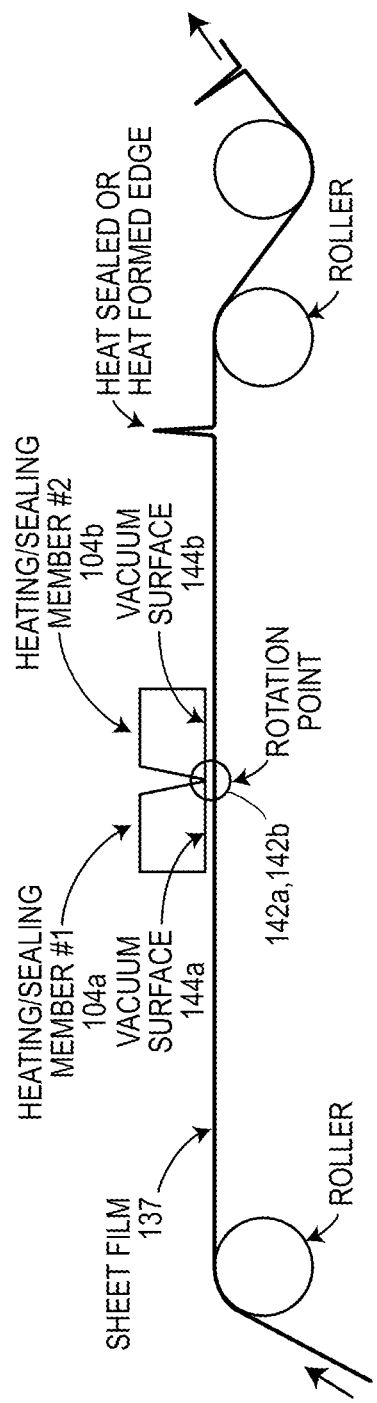
FIGS. 6A and 6B are schematic drawings of edge formers in accordance with embodiments of the disclosure.
Figure 6B:
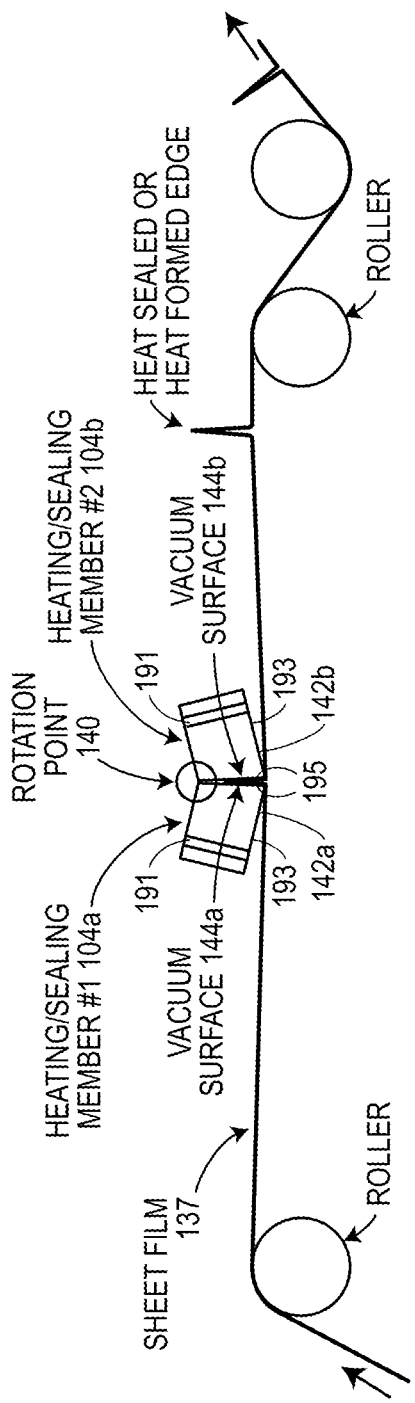

Referring to FIGS. 6A and 6B, in yet another embodiment, the first heating and/or sealing member 104a may rotatably articulate (i.e., pivot) around a first rotational axis 142a and the second heating and/or sealing member 104b may rotatably articulate (i.e., pivot) around or about a second rotational axis 142b. The first heating and/or sealing member 104a and the second heating and/or sealing member 104b may each pivot about the first and second rotational axis 142a, 142b in any suitable manner, such as a by use of a pin and hinge assembly, for example. The first and second rotational axis 142a, 142b may each extend in a direction parallel to the first heat/seal axis 124a and/or the second heat/seal axis 124b. In some embodiments, the first and second rotational axis 142a, 142b may be coaxially-aligned or may be offset. Each of the first heating and/or sealing member 104a and the second heating and/or sealing member 104b may pivot around each corresponding rotational axis 142a, 142b from a first position (illustrated in FIG. 6A) to a second position (illustrated in FIG. 6B), and vice versa.

In the first position a first engagement corner 144a of the first heating and/or sealing member 104a and a second engagement corner 144b of the second heating and/or sealing member 104b may be rotatably offset from each other. When the first heating and/or sealing member 104a and the second heating and/or sealing member 104b are pivoted from the first position to the second position, the first engagement corner 144a and second engagement corner 144b are each rotated to a position in which the first engagement corner 144a is adjacent to the second engagement corner 144b and a portion of the sheet 137 is disposed between the first engagement corner 144a and the second engagement corner 144b. In some embodiments, the engagement portion 114 of the folding member 102 may be disposed between the first engagement corner 144a is adjacent to the second engagement corner 144b in the second portion, and the folding member 102 may linearly displace (e.g., along the widthwise axis) to a position in which a portion of the engagement portion 114 is disposed between the first engagement corner 144a and the second engagement corner 144b. Due to heating of the sheet 137 by the first heating and/or sealing member 104a and the second heating and/or sealing member 104b, contact by the first engagement corner 144a and the second engagement corner 144b forms a seal on the sheet 137. In some embodiments, the folding member 102 may also linearly displace (e.g., along the widthwise axis) following sealing to a position in which the portion of the engagement portion 114 is not disposed between the first engagement corner 144a and the second engagement corner 144b. In other embodiments, one or more vacuum channels 191 (see FIG. 6B) may extend through one or both of the first heating and/or sealing member 104a and the second heating and/or sealing member 104b, and each of the vacuum channels 191 may be in communication with a vacuum source (not shown). As illustrated in FIG. 6B, in the second position, the one or more vacuum channels 191 may be disposed through a first surface 193 of each of the first heating and/or sealing member 104a and the second heating and/or sealing member 104b, and the first surface 193 may be parallel or substantially parallel to the sheet 137 in the second position. So positioned, the vacuum channels 191 secure a portion of the sheet 137 to the first surface 193 of each of the first heating and/or sealing member 104a and the second heating and/or sealing member 104b, and contact by the first engagement corner 144a and the second engagement corner 144b forms a seal on the sheet 137. In other embodiments (not shown), one or more vacuum channels 191 may be disposed through an inwardly-facing second surface 195 of each of the first heating and/or sealing member 104a and the second heating and/or sealing member 104b, and the second surfaces 195 may be disposed perpendicular to the first surface 193.

It is also contemplated herein that any embodiment of the edge former 100 may be used on a Continuous Motion type machine. In such embodiments, the above components may also be articulated as needed to follow the motion of the film and then returned to a starting position ready for the next cycle. This motion may be provided using mechanical means or preferably by using linear motors or servos. In an embodiment, the edge former station can be disposed at the bottom of the forming tube and can be attached to seal jaw disposed at the bottom of the forming tube.

Referring to FIGS. 4 and 15, in accordance with an embodiment, one or more of the longitudinal edges can be formed before the flexible material is supplied to the forming tube 60 of a packaging machine 50. An edge former (e.g., the edge former 100a) can be positioned at a desired location along the transport path of the flexible material.

Referring to FIGS. 7A, 8A, and 8B, in yet another embodiment, one or more of the longitudinal edges can be formed or sealed while the flexible material is disposed on the forming tube 60. In such an embodiment, the edge former 100 can be disposed on the forming tube 60, downstream of a forming shoulder 62 which wraps the flexible material around the forming tube 60 in a known manner. In some embodiments, the forming tube 60 may extend along the transport axis 52 from a first end 64a to a longitudinally-opposite second end 64b that is downstream of the first end 64a, and the edge former 100 may be disposed at or adjacent to the second end 64b of the forming tube 60. In other embodiments, the edge former 100 may be disposed between the first end 64a and the second end 64b of the forming tube 60.

In embodiments in which the edge former 100 is disposed on the forming tube 60, the folding member 102 can be disposed on the forming tube 60. For example, the folding member 102 can extend from the forming tube 60. The folding member 102 can for example be an integral component of the forming tube 60. As illustrated in FIGS. 8A and 8B, in various embodiments, the forming tube 60 can be contoured and/or shaped to accommodate the folding member 102. For example, a recess portion 146 may be formed in the forming tube 60 and the recess portion may extend along a transverse axis through the forming tube 60 (e.g., an axis parallel to the Y-axis of the reference coordinate system of FIG. 8A).

In various embodiments in which the edge former 100 is disposed on the forming tube 60, the folding member 102 and the first and second heating and/or sealing members. 104a, 104b may be disposed perpendicular to the transport axis 52 of the forming tube 60 or one or both of the folding member and the heading and/or sealing member may be disposed at an angle relative to the forming tube. In other embodiments, one or more edge former 100 may be disposed to define a contoured edge or feature on a package 10 instead of a longitudinal edge. In some embodiments, the first and second heating and/or sealing member 104a, 104b may heat and/or form a portion of the package 10 that is to have a defined feature or non-linear contoured edge.

In embodiments in which the edge former 100a is disposed on the forming tube 60, the forming tube 60 may include cut outs and/or be contoured or shaped downstream of the edge former 100a to accommodate the flexible material having the formed edge or sealed edge transverse to the transport path.

In some embodiments, such as those illustrated in FIGS. 18A to 18H, 19A to 19G, 20A to 20G, and 21A to 21H, a packaging machine 50 may include two edge formers (i.e., a first edge former 100a and a second edge former 100b). Each of the first edge former 100a and the second edge former 100b may be at least partially secured to a portion of the forming tube 60 such that the first heat/seal axis 124a, the second heat/seal axis 124b of the first and second heating and/or sealing member 104a, 104b and the lengthwise axis 108 of the folding member 102 is disposed normal to the transport axis 52. The first and second heating and/or sealing member 104a, 104b may be secured to the forming tube 60, or the folding member 102 may be secured to the forming tube 60 for either of the first edge former 100a and/or the second edge former 100b. The first and second heating and/or sealing member 104a, 104b may be secured to opposing walls 178a, 178b comprising the forming tube 60 such that the lengthwise axis 110 of each folding member 102 is aligned or parallel. The first heat/seal axis 124a, the second heat/seal axis 124b of the first and second heating and/or sealing member 104a, 104b and the lengthwise axis 108 of the folding member 102 for each of the first edge former 100a and/or the second edge former 100b may also be horizontally aligned (e.g., aligned along the X-Y plane of the reference coordinate system of FIG. 18A). Each of the first edge former 100a and the second edge former 100b may have an extension portion 180 that may be adapted to be coupled to an actuator (not shown), for example. The extension portion 180 may be elongated and may extend normal to the first heat/seal axis 124a, the second heat/seal axis 124b of the first and second heating and/or sealing member 104a, 104b, and/or the lengthwise axis 108 of the folding member 102.

In an alternative embodiment, the edge former can include complimentary heating and/or sealing members 104a, 104b and no folding member 102. In such embodiments, such as that illustrated in FIG. 16, the heating and/or sealing members 104a, 104b may be disposed adjacent to one or more vacuum or suction ports 148 to grip the film at desired locations, and the one or more vacuum or suction ports 148 may be in communication with the gap 136 between the first and second heating and/or sealing members 104a, 104b. In other embodiments, the one or more vacuum or suction ports 148 may be formed through one or more portions of one or more of the heating and/or sealing members 104a, 104b. In embodiments in which the edge former 100 is disposed on the forming tube 60, the forming tube 60 may be cut out at a desired location to create a recess portion 146 to allow for the complimentary sealing members 104a, 104b to be disposed in the path of the forming tube.

In various embodiments, a packaging machine 50 includes at least one seal jaw 150 disposed downstream of the forming tube 60 for forming a leading seal 152 (see FIG. 1A) and optionally a combined leading and trailing seal 154 (see FIG. 1B) of the package 10. In embodiments in which the edge former 100 is disposed at a bottom of the forming tube 60, the edge former 100 can engage the flexible material before, after, or at substantially the same time as the at least one seal jaw 50 engages the flexible material to form the leading seal 152 (see FIG. 1A). In embodiments in which the edge former 100 engages the flexible material before the at least one seal jaw 150 engages, the process may be performed without adjusting the pull belts (not shown) of the packaging machine 50 for advancing the flexible material along the transport path. In embodiments in which the edge former 100 engages the flexible material after or at substantially the same time as the at least one seal jaw 150, the pull belts may advance the flexible material to provide additional flexible material for forming the edge or seal. Alternatively, the speed of the pull belts can be varied to temporarily increase when or just prior to when the edge former 100 is engaged to provide additional flexible material for forming the edge and/or sealing the edge. The edge former can be engaged with the flexible material before product is dispensed into the package in the region of the folding member.

Figure 9:
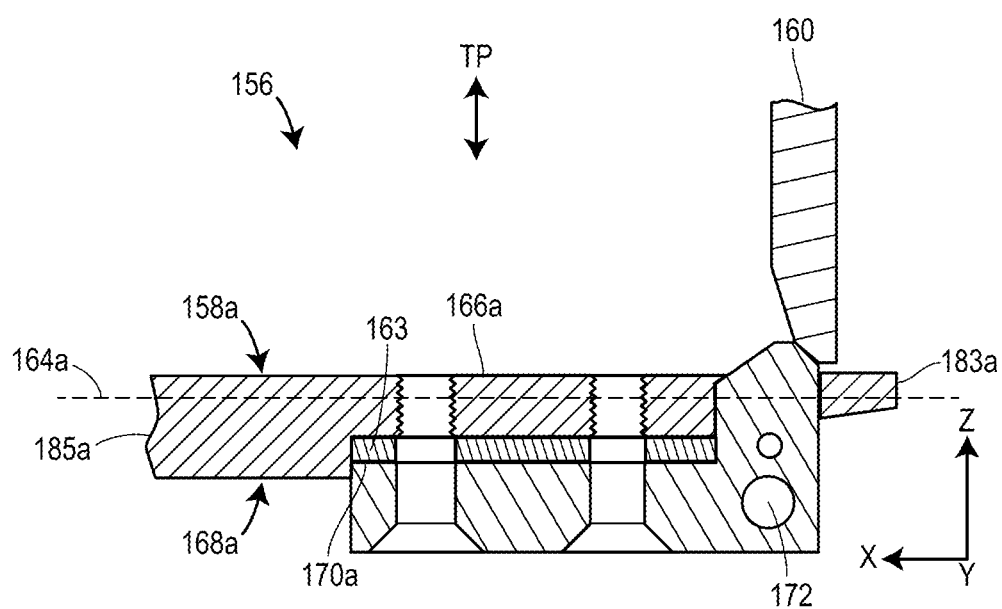
FIG. 9 is a schematic drawing of a first flap folding station in accordance with an embodiment of the disclosure.

Referring to FIG. 9, in various embodiments, the packaging machine 50 can include a first flap folding station 156 including one or more first flap folders 158a for folding a leading seal 152 (see FIG. 1A) of the package 10 over such that it is disposed in a plane substantially perpendicular to the transport path (or the transport axis 52) of the flexible material. As illustrated in FIG. 22, the first flap folder 158a may be elongated along a folding axis 162a that extends from a first end 164a to a second end 165a. The first flap folder 158a may be pivotably mounted to a portion of the machine 50 or a portion of a module that may be positioned adjacent to the machine 50. The first flap folder 158a may pivot about the folding axis 162a from a first engaged position (see FIG. 23A) to a second disengaged position (see FIG. 23B), and the folding axis 162a may be normal to the transport axis 52 (and normal to the X-axis or Y-axis of the reference coordinate system of FIGS. 8A and/or 9). In alternative embodiments, the first flap folder 158a may longitudinally translate along an axis 172 from a first engaged position (see FIG. 24A) to a second disengaged position (see FIG. 24B). In other embodiments, the first flap folder 158a may pivot and may longitudinally translate along the axis 172. As illustrated in FIGS. 9 and 22, the first flap folder 158a may extend along a widthwise axis 181a from an engagement end 183a to a support end 185a, and the support end 185a may be adjacent to the folding axis 162a. Referring to FIGS. 9 and 22, the first flap folder 158a may have an engagement surface 166a (that may be planar or substantially planar, for example) adapted to contact or engage the leading seal 152 (see FIG. 1A) of the package 10 when the first flap folder 158a is in the first engaged position, thereby folding the leading seal 152 (see FIG. 1A) of the package 10 to be normal to the transport path (or the transport axis 52) of the flexible material. In the first engaged position, the engagement surface 166a may be normal to the transport axis 14 (e.g., the Z-axis of the reference coordinate system of FIG. 9), and the widthwise axis 181a may be parallel to the X-axis of the of the reference coordinate system of FIG. 9. Residual heat in the material of the package 10 may cause the leading seal 152 to bond or seal to a portion of the package 10 adjacent to the leading seal 152 so the leading seal 152 remains normal to the transport path (or parallel to the panel of the package 10 to which it is adjacent). An opposed surface 168a of the first flap folder 158a that is opposite to the engagement surface 166a may have a recess 170a adapted to receive all or a portion of the insulator 163 and a portion of a heater 172 that is adapted to heat all or a portion (e.g., a portion at or adjacent to the engagement end 183a) of the first flap folders 158a.

In some embodiments, such as that illustrated in FIG. 25, the first flap folding station 156 may include the first flap folder 158a and a second flap folder 158b. The second flap folder 158b may be a minor-image of (but otherwise identical to) the first flap folder 158a, and like reference numbers of the second flap folder 158b and the first flap folder 158a may be the same but designated by an "a" or "b" to distinguish between the two. In a first position illustrated in FIG. 25A (in which each of the first and second folders 158a, 158b in the first engaged position illustrated in FIG. 23A), the first flap folder 158a may extend along the widthwise axis 181a and the second flap folder 158b may extend along the widthwise axis 181b, and the widthwise axis 181a of the first flap folder 158a may be aligned with or parallel to the widthwise axis 181b of the second flap folder 158b. In addition, the engagement surface 166a of the first flap folder 158a may be parallel to and coplanar (or substantially coplanar with) the engagement surface 166b of the second flap folder 158b. A first gap 186 may separate the engagement end 183a of the first flap folder 158a from the engagement end 183b of the second the flap folder 158b.

To create a seal, the first flap folder 158a may translate along the widthwise axis 181a towards the second flap folder 158b and/or the second flap folder 158b may translate along the widthwise axis 181b towards the first flap folder 158a from the first position of FIG. 25A to a second position illustrated in FIG. 25B. In the second position, a second gap 187 (that is smaller than the first gap 186) may separate the engagement end 183a of the first flap folder 158a from the engagement end 183b of the second the flap folder 158b. The translation along the widthwise axis 181a, 181b, along with the contact by heated engagement end 183a of the first flap folder 158a and the second flap folder 158b may displace one or more portions of the sheet 137 of flexible material to form a crease (e.g., upwardly enter the second gap 187) between the engagement end 183a of the first flap folder 158a from the engagement end 183b of the second the flap folder 158b, thereby forming and/or sealing the edge (e.g., any of the first, second, third, and fourth longitudinal edges 26, 28, 30, 32). For example, as illustrated in FIG. 25C, the engagement end 183a of the first flap folder 158a (of the first flap folding station 156 or of a second flap forming station 189 illustrated in FIGS. 10A to 10D and described in more detail in following sections) may be stationary and the engagement end 183*b* of the second flap folder 158*b* may translate along the widthwise axis 181*b* towards the engagement end 183*a* of the first flap folder 158*a*. Due in part to the heating of the portion (e.g., portion 197) of the sheet 137 of flexible material, the portion 197 of the sheet 137 may be displaced by the moving engagement end 183*b* of the second flap folder 158*b* and the portion may upwardly extend into a gap 199 between the engagement end 183*a* of the first flap folder 158*a* and the engagement end 183*b* of the second flap folder 158*b*. Continued displacement of the engagement end 183*b* of the second flap folder 158*b* towards the engagement end 183*a* of the first flap folder 158*a* may cause further upward movement of the portion 197 of the sheet 137 until the engagement ends 183*a*, 183*b* reach the second position of 25B. In the second position, the engagement end 183*b* of the second flap folder 158*b* and the engagement end 183*a* of the first flap folder 158*a* apply pressure to the portion 197 of the sheet 137 to form the crease or seal.

In embodiments that form a corner seal (such as the seal of FIG. 25E), for example, the engagement end 183*a* of the first flap folder 158*a* (of the first flap folding station 156 or of the second flap forming station 189) may be stationary and the engagement end 183*b* of the second flap folder 158*b* may translate along the widthwise axis 181*b* towards the engagement end 183*a* of the first flap folder 158*a*, as illustrated in FIG. 25D. Due in part to the heating of the portion 197 of the sheet 137 and to the proximity of the portion 197 to a corner of the formed package 10, the portion 197 of the sheet 137 may be disposed at an edge of the sheet 137 that forms an angle (between for example, 60° and 120°, such as 90°, for example) in the sheet 137 by the displacement of the moving engagement end 183*b* of the second flap folder 158*b*. Continued displacement of the engagement end 183*b* of the second flap folder 158*b* towards the engagement end 183*a* of the first flap folder 158*a* may cause further upward movement of the portion 197 of the sheet 137 until the engagement ends 183*a*, 183*b* reach the second position of 25B. In the second position, the engagement end 183*b* of the second flap folder 158*b* and the engagement end 183*a* of the first flap folder 158*a* apply pressure to the portion 197 of the sheet 137 to form corner seal 201 (see FIG. 25E).

One skilled in the art would recognize that the engagement end 183*a* of the first flap folder 158*a* may translate and the engagement end 183*b* of the second flap folder 158*b* may remain stationary, or that both the engagement end 183*a* of the first flap folder 158*a* and the engagement end 183*b* of the second flap folder 158*b* translate towards each other. The skilled person would also recognize that any other manner of causing a crease or edge (e.g., by the addition of edges or plates on the engagement end 183*a* of the first flap folder 158*a* and/or the engagement end 183*b* of the second flap folder 158*b*) is also contemplated. To control or limit the force applied to the sheet by the engagement ends, 183*a* 183*b*, the first flap folder 158*a* and/or the second flap folder 158*b* may be coupled to one or more springs.

In this manner, the first flap folder 158*a* and the second flap folder 158*b* may comprise an edge former 100, and the engagement end 183*a* of the first flap folder 158*a* may correspond to the first heating and/or sealing member 104*a* and the engagement end 183*b* of the second the flap folder 158*b* may correspond to the second heating and/or sealing member 104*b*.

Following the forming of the seal (i.e., the seal process), the first flap folder 158*a* may translate along the widthwise axis 181*a* away from the second flap folder 158*b* and/or the second flap folder 158*b* may translate along the widthwise axis 181*b* away from the first flap folder 158*a* from the second position of FIG. 25B to the first position illustrated in FIG. 25A. The first flap folder 158*a* and/or the second flap folder may then pivot from the first engaged position illustrated in FIG. 23A to the second disengaged position of FIG. 23B. In other embodiments, following the seal process, the first flap folder 158*a* and/or the second flap folder may then pivot from the first engaged position illustrated in FIG. 23A to the second disengaged position of FIG. 23B without translating along the widthwise axis 181*b* from the second position of FIG. 25B to the first position of FIG. 25A.

In some embodiments, as previously explained, the first flap folder 158*a* may remain stationary in the first engaged position illustrated in FIG. 23A during the sealing process, and the second flap folder 158*b* may translate along the widthwise axis 181*b* towards the first flap folder 158*a* from the first position of FIG. 25A to the second position illustrated in FIG. 25B. In this configuration, the engagement end 183*a* of the first flap folder 158*a* may provide a stop for the heated portion 197 (see FIG. 25C) of the sheet 137 as the heated portion of the sheet is displaced towards the first flap folder 158*a* (and displaced upward to enter the gap 199 of FIG. 25C) by the engagement end 183*b* of the second the flap folder 158*b*.

In various embodiments, the packaging machine 50 can include a package holding guide 160 disposed upstream the first flap folder 158*a*. The package holding guide 160 may include a plurality of planar surfaces (each extending along the transport axis 52) that cooperate to correspond to the shape of the perimeter or circumference of the package 10. With the package disposed within the package holding guide 160, the package holding guide 160 provides support for the package 10 while an edge is sealed or while a leading seal 152 (see FIG. 1A) of the package 10 is folded as described. In addition, an edge portion of the package holding guide 160 may provide support for the portion (e.g., the portion 197 of FIG. 25C) of the sheet engaged by the engagement end 183*a*, 183*b* of the first and/or second flap folders 158*a*, 158*b* during the sealing process. More particularly, one of the engagement end 183*a* of the first flap folder 158*a* and the engagement end 183*b* of the second flap folder 158*b* may translate towards the stationary edge portion of the package holding guide 160 to form a crease or edge as previously described. Specifically, with reference to FIG. 25D, the skilled person would recognize that a portion of an upper or lower perimeter edge of the package holding guide 160 could be substituted or used instead of the illustrated stationary engagement end 183*a* of the first flap folder 158*a*. That is, the engagement end 183*b* of the second flap folder 158*b* may translate along the widthwise axis 181*b* towards the portion of an upper or lower perimeter edge of the package holding guide 160. Due in part to the heating of the portion 197 of the sheet 137 and to the proximity of the portion 197 to a corner of the formed package 10, the portion 197 of the sheet 137 may be disposed at an edge of the sheet 137 that forms an angle (between for example, 60° and 120°, such as 90°, for example) in the sheet 137 by the displacement of the moving engagement end 183*b* of the second flap folder 158*b*. Continued displacement of the engagement end 183*b* of the second flap folder 158*b* towards the portion of an upper or lower perimeter edge of the package holding guide 160 may cause further upward movement of the portion 197 of the sheet 137 until the engagement ends 183*a*, 183*b* reach the second position of 25B. In the second position, the engagement end 183*b* of the second flap folder 158*b* and the portion of an upper or lower perimeter edge of the package holding guide 160 apply pressure to the portion 197 of the sheet 137 to form corner seal 201 (see FIG. 25E).

In various embodiments, the packaging machine 50 can include a first flap folding station 156 (see FIG. 9) and a second flap folding station 189 (see FIGS. 10A to 10D, 12A-D, 26A to 26H, and 27A to 27F) upstream (or downstream) of the first flap folding station 156. In some embodiments, the first flap folding station 156 may be on one longitudinal end of the package holding guide 160, and the second flap folding station 189 may be at another end of the package holding guide 160. The second flap folding station 189 may include a first flap folder 158a and/or a second flap folder 158b for folding a trailing seal 154 (see FIG. 1B) of the package 10 over such that the trailing seal 154 is disposed in a plane substantially perpendicular to the transport path (or the transport axis 52) of the flexible material. The first and/or second flap folder 158a, 158b of the second flap folding station 189 may be substantially identical in form and function to first and/or second flap folder 158a, 158b of the first flap folding station 156, with the only difference being that the first and/or second flap folder 158a, 158b of the second flap folding station 189 are oriented with the engagement surfaces 166a, 166b facing downward such that the engagement surfaces 166a, 166b are adapted to contact or engage the trailing seal 154 (see FIG. 1B) of the package 10 when the first and second flap folders 158a, 158b are in the first engaged position, thereby folding the trailing seal 154 (see FIG. 1B) of the package 10 to be normal to the transport path (or the transport axis 52) of the flexible material. Because the first flap folder 158a and/or a second flap folder 158b are identical in both the first flap folding station 156 and the second flap folding station 189, the reference numbers associated with identical features of the first and/or second flap folder 158a, 158b of the first flap folding station 156 and the second flap folding station 189 will be identical. Accordingly, similar to the first and/or second flap folder 158a, 158b of the first flap folding station 156, the first and/or second flap folder 158a, 158b of the second flap folding station 189 may pivot about the respective folding axis 162a, 162b from a first engaged position (see FIG. 10B) to a second disengaged position (see FIG. 10D), as previously described.

In the first engaged position, the engagement surface 166a may be normal to the transport axis 14 (e.g., the Z-axis of the reference coordinate system of FIG. 9), and the widthwise axis 181a may be parallel to the X-axis of the of the reference coordinate system of FIG. 10A. As previously explained, residual heat in the material of the package 10 may cause the trailing seal 154 to bond or seal to a portion of the package 10 adjacent to the trailing seal 154 so the trailing seal 154 remains normal to the transport path (or parallel to the panel of the package 10 to which it is adjacent).

To create a seal, the first flap folder 158a of the second flap folding station 189 may translate along the widthwise axis 181a towards the second flap folder 158b and/or the second flap folder 158b may translate along the widthwise axis 181b towards the first flap folder 158a from the first position of FIG. 10B to a second position illustrated in FIG. 10C. In the second position, a second gap 187 (that is smaller than the first gap 186) may separate the engagement end 183a of the first flap folder 158a from the engagement end 183b of the second the flap folder 158b. As previously described, the translation of the along the widthwise axis 181a, 181b, along with the contact by heated engagement end 183a of the first flap folder 158a and the second flap folder 158b may displace one or more portions of the sheet to form a crease (e.g., upwardly enter the second gap 187) between the engagement end 183a of the first flap folder 158a from the engagement end 183b of the second the flap folder 158b, thereby forming and/or sealing the edge (e.g., any of the first, second, third, and fourth longitudinal edges 26, 28, 30, 32). To control or limit the force applied to the sheet by the engagement ends, 183a 183b, the first flap folder 158a and/or the second flap folder 158b may be coupled to one or more springs.

In this manner, the first flap folder 158a and the second flap folder 158b may comprise an edge former 100, and the engagement end 183a of the first flap folder 158a may correspond to the first heating and/or sealing member 104a and the engagement end 183b of the second the flap folder 158b may correspond to the second heating and/or sealing member 104b.

Following the forming of the seal (i.e., the seal process), the first flap folder 158a may translate along the widthwise axis 181a away from the second flap folder 158b and/or the second flap folder 158b may translate along the widthwise axis 181b away from the first flap folder 158a from the second position of FIG. 10C to the first position illustrated in FIG. 10B. The first flap folder 158a and/or the second flap folder may then pivot from the first engaged position illustrated in FIG. 10B to the second disengaged position of FIG. 10D. In other embodiments, following the seal process, the first flap folder 158a and/or the second flap folder 158b may then pivot from the first engaged position illustrated in FIG. 23A to the second disengaged position of FIG. 10D without translating along the widthwise axis 181b from the second position of FIG. 10C to the first position of FIG. 10B.

In some embodiments, during the sealing process, the first flap folder 158a may remain stationary in the first engaged position illustrated in FIG. 10B and the second flap folder 158b may translate along the widthwise axis 181b towards the first flap folder 158a from the first position of FIG. 10B to the second position illustrated in FIG. 10B. In this configuration, the engagement end 183a of the first flap folder 158a may provide a stop for the heated portion of the sheet as the heated portion of the sheet is displace towards the first flap folder 158a (and displaced upward to enter the second gap 187) by the engagement end 183b of the second the flap folder 158b.

In various embodiments, with the package 10 disposed within the package holding guide 160, the package holding guide 160 provides support for the package 10 while an edge is sealed or while a trailing seal 154 (see FIG. 1B) of the package 10 is folded as described. In addition, an edge portion of the package holding guide 160 may provide support for the portion of the sheet engaged by the engagement end 183a, 183b of the first and/or second flap folders 158a, 158b of the second flap folding station 189 during the sealing process.

Figure 11:
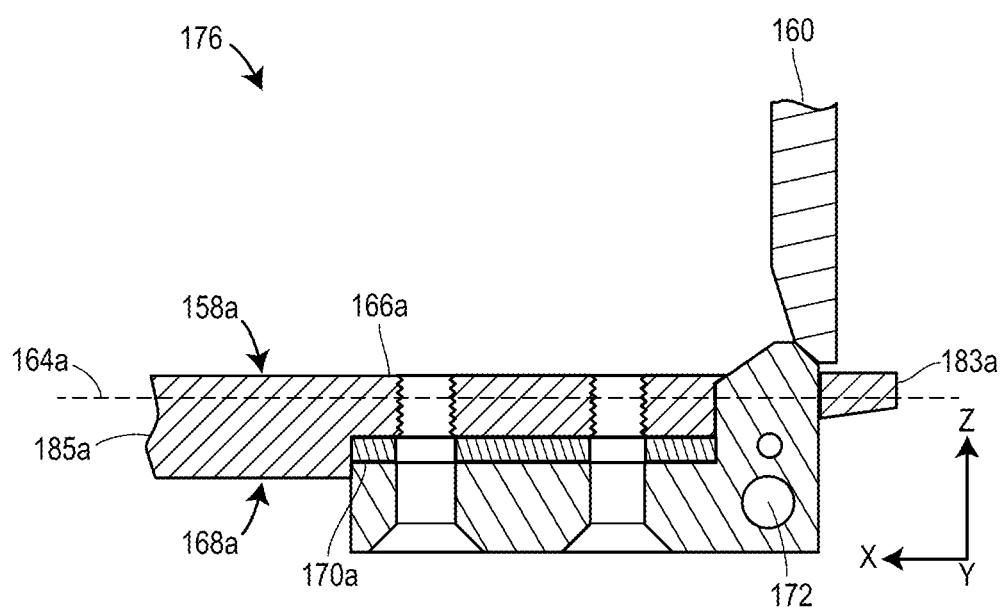
FIG. 11 is a schematic drawing of a package drop plate assembly in accordance with an embodiment of the disclosure.
Figure 12B:
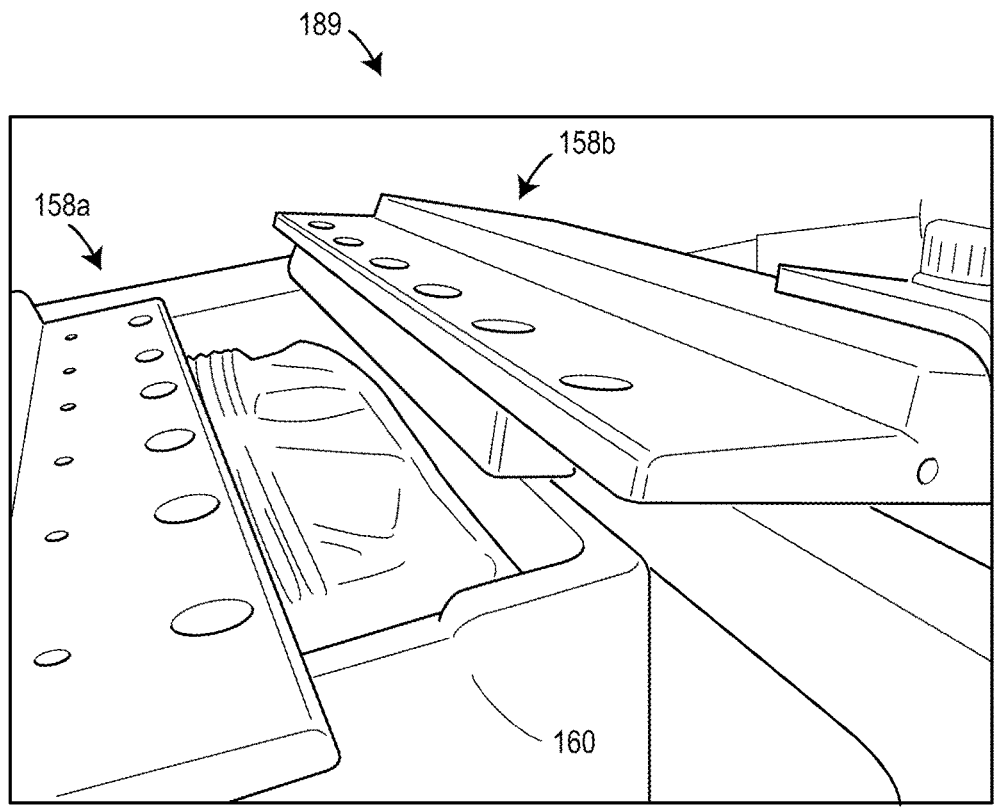

Referring to FIG. 11, embodiments of the packaging machine 50 can include a package drop plate assembly 176 downstream of the forming tube 60 and any leading and trailing seal stations and flap folding stations (i.e., the first and second flap folding stations 156, 189. The package drop plate assembly 176 may be similar or identical (in both structure and function) to the first flap folding station 156, and the package drop plate assembly 176 may include a first flap folder 158a and a second flap folder 158b. In an embodiment, the package drop plate assembly 176 can be positioned such that a package 10 can be retained in or on the package drop plate assembly 176 while the second flap folding station 189 folds the trailing seal 154. The package drop plate assembly 176 can be actuated, for example, linear or rotary pneumatics and/or by linear and/or rotary motors or servos (not shown). An edge former 100 can be incorporated into the package drop plate assembly 176 in that same way the edge former 100 is incorporated into the first flap folding stations 156, as previously described.

In another embodiment, the packaging machine 50 includes the forming box 174 upstream of the package drop plate assembly 176 and the edge former 100 can be attached to or integrated directly into the bottom of the forming box 174, upstream (above) the package drop plate assembly 76.

In yet another embodiment, the formed and/or seal edges can be formed in the flexible material before the flexible material or roll of flexible material is provided on a packaging machine 50. In such embodiments an edge former 100 as describe above having a folding member 102 and heating and/or sealing member 104 or having two complementary heating and/or sealing members 104a, 104b may be used as described above.

A packaging machine can include one or more edge formers 100 disposed at any of the above-described locations or in a single location.

The formed edges of the packages 10 in accordance with embodiments of the disclosure can be formed perpendicular to the flexible material or can be oriented at any suitable angle relative to the flexible material from which it extends. Additionally, the methods and equipment disclosed herein can be used to form edges that are not transverse to the transport path, for example, by position the edge former in the packaging machine 50 in a desired location and oriented to form an edge in a different direction, for example, in the direction of the transport path.

Aspects

1. Forming at least one folded edge before the Forming Tube:
   a. This embodiment would be positioned in a desired location along the film path and would include at least one Film Folding Member with a desired folding profile, (such as linear, arcuate, curved, complex, wavy, etc.) and at least one Heating/Sealing Member that folds the film around the Film Folding Member and either heat seals the film together to form a Heat Sealed Edge or just heats the film without sealing it to form a Heat Formed Edge. The Heating/Sealing Member(s) may have a profile that is complimentary to the desired folding profile or it may have a different profile.
   b. This embodiment may also be realized:
      i. without a Film Folding Member, but having 2 complimentary Heating/Sealing Members with Vacuum ports to grip the film in the desired location,
      ii. rotatably articulating the Heating/Sealing Members around a pivoting/folding "edge", and then,
      iii. forming either a Heat Sealed Edge or a Heat Formed Edge.
   c. The Heating/Sealing Member(s) may also be actuated, preferably by linear or rotary pneumatics or by linear or rotary motors or servos.
   d. The Film Folding Member(s) may also be actuated, preferably by linear or rotary pneumatics or by linear or rotary motors or servos.
   e. The Film Folding Member(s) may also have at least one Stripper Plate to keep the film from sticking to it.
   f. The Stripper Plate(s) may also be spring loaded or may be actuated.
   g. The Film Folding Member(s) may also be embodied by partial segments of the folding profile and the Heating/Sealing Member(s) may Heat or Seal through the open parts of the Film Folding Member(s).
   h. The Heating/Sealing Member(s) may also be embodied by partial segments of the Sealing/Forming profile.
   i. If used on a Continuous Motion type machine, the above components may also be articulated as needed to follow the motion of the film and then returned to a starting position ready for the next cycle. This motion may be provided using mechanical means or preferably by using linear motors or servos.

2. Forming at least one folded edge on the Forming Tube:
   a. This embodiment on an intermittent motion machine may use step 1a and it may also use any or all of step(s) 1c, 1e, 1f (preferably as spring loaded only), 1g, and 1h above except that it would be positioned in a desired location along the Forming Tube after the Film Forming Shoulder.
   b. This embodiment on an intermittent motion machine may use step 1b and it may also use any or all of step(s) 1c, and 1h above except that it would be positioned in a desired location along the Forming Tube after the Film Forming Shoulder.
   c. If used on a Continuous Motion type machine, the components in step 2b above may be articulated as needed to follow the motion of the film and then returned to a starting position ready for the next cycle. This motion may be provided using mechanical means or preferably by using linear motors or servos.
   d. The Forming Tube may also be cut out at a desired location to allow for step 2b.
   e. The Forming Tube may also be contoured or shaped to allow for a Film Folding Member.
   f. The Forming Tube may also be cut out, contoured, or shaped to allow for the new film shape to continue along the tube after the Heat Sealed Edge(s) or Heat Formed Edge(s) are formed.
   g. The Film Folding Member(s) and/or the Heating/Sealing Member(s) may also be oriented perpendicular to the Forming Tube or, alternatively, they may be oriented at a desired angle to the Forming Tube.

3. Forming at least one folded edge at the bottom of the Forming Tube:
   a. This embodiment may use step 2a and it may also use any or all of step(s) 2d, 2e, and 2g except that it would be located substantially at the bottom of the Forming Tube.
   b. This embodiment may use step 2b and it may also use any or all of step(s) 2d and 2g except that it would be located substantially at the bottom of the Forming Tube.
   c. This embodiment may use step 2c and it may also use any or all of step(s) 2d and 2g except that it would be located substantially at the bottom of the Forming Tube.
   d. The components in step 2c may also be mounted to at least one Seal Jaw.
   e. The actuation of either step 3a or 3b may take place before the Seal Jaws have closed without having to adjust the Film Pull Belts.
   f. The actuation of either step 3a or 3b may take place after the Seal Jaws have closed. The Film Pull Belts could then be incrementally advanced to provide the additional film needed for the Heat Sealed Edge or the Heat Formed Edge without having the additional weight of the package below.
  g. The actuation of step 3c may take place either before or after the Seal Jaws have closed. The speed of the Film Pull Belts could then be temporarily increased to provide the additional film needed for the Heat Sealed Edge or the Heat Formed Edge and then the speed could be set back to normal to keep the film moving at the desired rate.
  h. The actuation of either step 3a, 3b, or 3c may preferably take place prior to the next charge of product entering the folded edge area.
4. Forming at least one folded edge at the Bottom Flap Folder:
  a. This embodiment would be positioned reasonably proximate to the Bottom Flap Folder and at a desired location to form either a Heat Sealed Edge or a Heat Formed Edge. This embodiment would include at least one Film Backing Member (also referred to herein as a folding member), with or without a desired folding profile, (such as linear, arcuate, curved, complex, wavy, etc.), and at least one Heating/Sealing Member that folds the film into the Film Backing Member and either heat seals the film together to form a Heat Sealed Edge or just heats the film without sealing it to form a Heat Formed Edge. The Heating/Sealing Member(s) may have a profile that is complimentary to the desired folding profile or it may have a different profile.
  b. The Heating/Sealing Member(s) may also be mounted to the Bottom Flap Folder and the Film Backing Member(s) may be mounted in a position(s) such that the Bottom Flap Folder/Heating/Sealing Member(s) can clamp the film against the Film Backing Member(s) and, thereby, form a Heat Sealed Edge or a Heat Formed Edge.
  c. The Film Backing Member(s) may also be mounted to the Bottom Flap Folder and the Heating/Sealing Member(s) may be mounted in a position(s) such that the Bottom Flap Folder/Film Backing Member(s) can clamp the film against the Heating/Sealing Member(s) and, thereby, form a Heat Sealed Edge or a Heat Formed Edge.
  d. The Film Backing Member(s) may also be a Heating/Sealing Member.
  e. The Heating/Sealing Member may also not be heated if only a better fold is required.
  f. The Heating/Sealing Member(s) may also be actuated, preferably by linear or rotary pneumatics or by linear or rotary motors or servos.
  g. The Film Backing Member(s) may also be actuated, preferably by linear or rotary pneumatics or by linear or rotary motors or servos.
  h. The Heating/Sealing Member(s) of step 4b or the Film Backing Member(s) of step 4c may also be thermally insulated from the Bottom Flap Folder.
  i. The Heating/Sealing Member(s) of step 4b or the Film Backing Member(s) of step 4c may also be mounted to the Bottom Flap Folder with a spring bias.
  j. The Heating/Sealing Member(s) of step 4b or the Film Backing Member(s) of step 4c may also be integrated directly into the Bottom Flap Folder.
  k. The Film Backing Member(s) of step 4b or the Heating/Sealing Member(s) of step 4c may also be integrated directly into the Package Holding Guide above the Bottom Flap Folder.
5. Forming at least one folded edge at the Top Flap Folder, (above the Forming Box):
  a. This embodiment would be positioned reasonably proximate to the Top Flap Folder and at a desired location to form either a Heat Sealed Edge or a Heat Formed Edge. This embodiment would include at least one Film Backing Member, with or without a desired folding profile, (such as linear, arcuate, curved, complex, wavy, etc.), and at least one Heating/Sealing Member that folds the film into the Film Backing Member and either heat seals the film together to form a Heat Sealed Edge or just heats the film without sealing it to form a Heat Formed Edge. The Heating/Sealing Member(s) may have a profile that is complimentary to the desired folding profile or it may have a different profile.
  b. The Heating/Sealing Member(s) may also be mounted to the Top Flap Folder and the Film Backing Member(s) may be mounted in a position(s) such that the Top Flap Folder/Heating/Sealing Member(s) can clamp the film against the Film Backing Member(s) and, thereby, form a Heat Sealed Edge or a Heat Formed Edge.
  c. The Film Backing Member(s) may also be mounted to the Top Flap Folder and the Heating/Sealing Member(s) may be mounted in a position(s) such that the Top Flap Folder/Film Backing Member(s) can clamp the film against the Heating/Sealing Member(s) and, thereby, form a Heat Sealed Edge or a Heat Formed Edge.
  d. The Film Backing Member(s) may also be a Heating/Sealing Member.
  e. The Heating/Sealing Member may also not be heated if only a better fold is required.
  f. The Heating/Sealing Member(s) may also be actuated, preferably by linear or rotary pneumatics or by linear or rotary motors or servos.
  g. The Film Backing Member(s) may also be actuated, preferably by linear or rotary pneumatics or by linear or rotary motors or servos.
  h. The Heating/Sealing Member(s) of step 5b or the Film Backing Member(s) of step 5c may also be thermally insulated from the Top Flap Folder.
  i. The Heating/Sealing Member(s) of step 5b or the Film Backing Member(s) of step 5c may also be mounted to the Top Flap Folder with a spring bias.
  j. The Heating/Sealing Member(s) of step 5b or the Film Backing Member(s) of step 5c may also be integrated directly into the Top Flap Folder.
  k. The Film Backing Member(s) of step 5b or the Heating/Sealing Member(s) of step 5c may also be integrated directly into the Forming Box below the Top Flap Folder.
6. Forming at least one folded edge below the Top Flap Folder, (at bottom of Forming Box):
  a. This embodiment starts by replacing the Takeaway Conveyor as we have the machine configured now with an actuated Package Drop Plate that serves to contain the package during the Top Flap Folding operation. The Package Drop Plate may be actuated, preferably by linear or rotary pneumatics or by linear or rotary motors or servos. From here, this embodiment would be positioned reasonably proximate to the Bottom of the Forming Box and at a desired location to form either a Heat Sealed Edge or a Heat Formed Edge. This embodiment would include at least one Film Backing Member, with or without a desired folding profile, (such as linear, arcuate, curved, complex, wavy, etc.), and at least one Heating/Sealing Member that folds the film into the Film Backing Member and either heat seals the film together to form a Heat Sealed Edge or just heats the film without sealing it to form a Heat Formed Edge. The Heating/Sealing Member(s) may have a profile that is complimentary to the desired folding profile or it may have a different profile.

b. The Heating/Sealing Member(s) may also be mounted to the Package Drop Plate and the Film Backing Member(s) may be mounted in a position(s) such that the Package Drop Plate/Heating/Sealing Member(s) can clamp the film against the Film Backing Member(s) and, thereby, form a Heat Sealed Edge or a Heat Formed Edge.

c. The Film Backing Member(s) may also be mounted to the Package Drop Plate and the Heating/Sealing Member(s) may be mounted in a position(s) such that the Package Drop Plate/Film Backing Member(s) can clamp the film against the Heating/Sealing Member(s) and, thereby, form a Heat Sealed Edge or a Heat Formed Edge.

d. The Film Backing Member(s) may also be a Heating/Sealing Member.

e. The Heating/Sealing Member may also not be heated if only a better fold is required.

f. The Heating/Sealing Member(s) may also be actuated, preferably by linear or rotary pneumatics or by linear or rotary motors or servos.

g. The Film Backing Member(s) may also be actuated, preferably by linear or rotary pneumatics or by linear or rotary motors or servos.

h. The Heating/Sealing Member(s) of step 6b or the Film Backing Member(s) of step 6c may also be thermally insulated from the Package Drop Plate.

i. The Heating/Sealing Member(s) of step 6b or the Film Backing Member(s) of step 6c may also be mounted to the Package Drop Plate with a spring bias.

j. The Heating/Sealing Member(s) of step 6b or the Film Backing Member(s) of step 6c may also be integrated directly into the Package Drop Plate.

k. The Film Backing Member(s) of step 6b or the Heating/Sealing Member(s) of step 6c may also be integrated directly into the Bottom of the Forming Box above the Package Drop Plate.

7. Forming at least one folded edge as a secondary operation or as an independent operation:

a. This embodiment envisions any or all of the steps 1a thru 1i being performed to the packaging film or Primapak film during manufacture of the film, as an independent operation, or as a secondary operation. The film with the at least one Heat Sealed Edge or a Heat Formed Edge is then wound on a roll for use on a packaging machine, (preferably a V/F/F/S machine).

b. This embodiment envisions any or all of the preceding steps, (1a thru 6k) being performed to the package or to the Primapak package after the package or the Primapak package is substantially formed. This embodiment may be done in-line with the other operations, as an independent operation, or as a secondary operation. The package would then have at least one new Heat Sealed Edge or a new Heat Formed Edge.

What is claimed is:

1. An apparatus for forming an edge seal along an edge portion of a flexible package that is made from a sheet of flexible material, the apparatus comprising:

a first flap folder extending along a widthwise axis from an engagement end to a support end, the widthwise axis being perpendicular to a transport path of the sheet of flexible material, wherein the first flap folder is arranged to receive a flexible package having a leading and/or trailing seal extending from a panel of the package, substantially parallel to the transport path, the first flap folder being configured to actuate between a disengaged position and an engaged position, the leading or trailing seal being arranged to be in a path of the first flap folder when it actuates between the disengaged position and the engaged position, and in the engaged position, the engagement end forces the leading or trailing seal over towards the panel of the package from which it extend such that the leading or trailing seal is perpendicular to the transport path and is disposed in the plane parallel to the panel; and a second flap folder extending along a widthwise axis from an engagement end to a support end, wherein the widthwise axis of the first flap folder is aligned with or parallel to the widthwise axis of the second flap folder, and wherein the first flap folder is linearly displaceable from the engaged position towards the second flap folder and/or the second flap folder is linearly displaceable towards the first flap folder in the engaged position thereby shifting the first and second flap folders between a first position and a second position, wherein in the first position, a portion of the sheet of flexible material of the panel and corresponding to the edge portion of the flexible package is disposed in a gap between the engagement end of the first flap folder and the engagement end of the second flap folder and in the second position, one or both of the first and second flap folders linearly displace to reduce a width of the gap and engage the portion of the sheet of flexible material disposed in the gap to form the edge seal along the edge portion of the flexible package.

2. The apparatus of claim 1, wherein the first flap folder and the second flap folder are each pivotable about a folding axis normal to the widthwise axis and adjacent to the support end to actuate the first flap folder and the second flap folder from the engaged position to the disengaged position.

3. The apparatus of claim 1, further comprising a heater coupled to at least one of the first flap folder and the second flap folder.

4. The apparatus of claim 1, wherein the engagement surface of the first flap folder and the second flap folder are each planar and aligned at least when the first flap folder is in the engaged position.

* * * * *